United States Patent [19]
Suyama

[11] Patent Number: 5,268,760
[45] Date of Patent: Dec. 7, 1993

[54] MOTION ADAPTIVE IMPULSE NOISE REDUCTION CIRCUIT

[75] Inventor: Masaki Suyama, Tokyo, Japan

[73] Assignee: Clarion Co., Ltd., Tokyo, Japan

[21] Appl. No.: 893,462

[22] Filed: Jun. 4, 1992

[30] Foreign Application Priority Data

| Jun. 7, 1991 | [JP] | Japan | 3-163626 |
| Nov. 15, 1991 | [JP] | Japan | 3-327091 |
| Nov. 15, 1991 | [JP] | Japan | 3-327092 |
| Nov. 15, 1991 | [JP] | Japan | 3-327093 |
| Nov. 15, 1991 | [JP] | Japan | 3-327097 |

[51] Int. Cl.$^5$ .......................... H04N 5/213
[52] U.S. Cl. .......................... 358/167
[58] Field of Search .......... 358/167, 36, 105

[56] References Cited

U.S. PATENT DOCUMENTS

| 4,682,230 | 7/1987 | Perlman et al. | |
| 4,987,481 | 1/1991 | Spears et al. | 358/167 X |
| 5,005,081 | 4/1991 | Asano | 358/167 |
| 5,161,018 | 11/1992 | Matsunaga | 358/167 |

FOREIGN PATENT DOCUMENTS

| 455218 | 11/1991 | European Pat. Off. |
| 63-110888 | 5/1988 | Japan |
| 63-110889 | 5/1988 | Japan |
| 63-110890 | 5/1988 | Japan |
| 63-114486 | 5/1988 | Japan |
| 63-139490 | 6/1988 | Japan |
| 4-77688 | 3/1992 | Japan |
| 2202706 | 9/1988 | United Kingdom |
| 2206012 | 12/1988 | United Kingdom |
| 0433866A1 | 6/1991 | United Kingdom |

OTHER PUBLICATIONS

Perlman, s.s.; "Adaptive Median Filtering for Impulse Noise Elimination in Real-Time TV Signals", IEEE Transactions on Communications, vol. Com-35, No. 6, Jun. 1987, pp. 646-652.

*Primary Examiner*—Mark R. Powell
*Attorney, Agent, or Firm*—Flynn, Thiel, Boutell & Tanis

[57] ABSTRACT

The noise eliminating circuit for a television receiver according to the present invention outputs an image signal without any noise by detecting and eliminating impulse noise and effecting interpolation for an image signal, in the case where C/N of a received signal is lowered and impulse noise is produced. The noise eliminating circuit stated above is a noise detecting circuit, which detects only the noise component and judges whether the C/N is such that impulse noise is produced or not, depending on the level of the detection output. In the case where it is judged that there exists an impulse noise, a noise reduction circuit detects an impulse noise portion in the image signal and a brightness signal and a chrominance signal of this portion are subjected to interpolation processing so that an image signal, from which the impulse noise component is removed.

27 Claims, 17 Drawing Sheets

FIG. 1
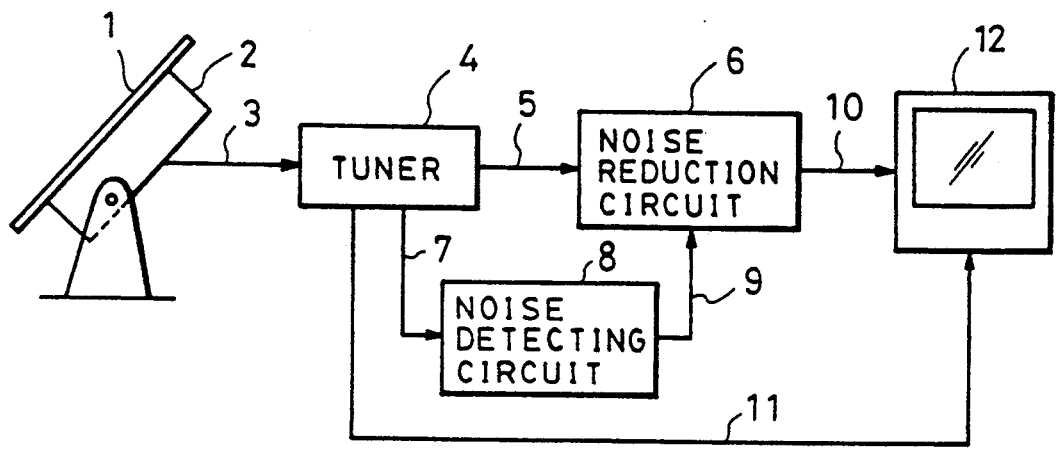
FIG. 2(a)
FIG. 2(b)
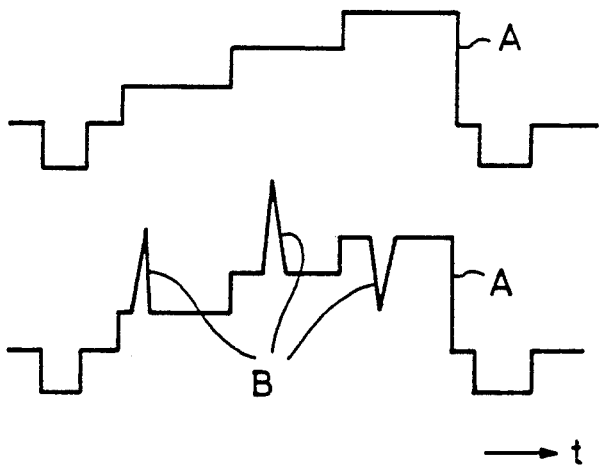

FIG. 8(a)    FIG. 8(b)
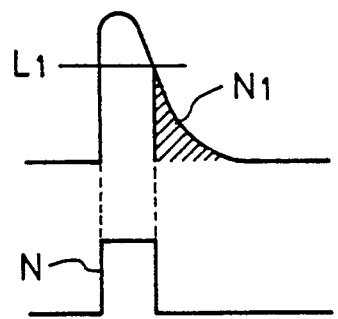
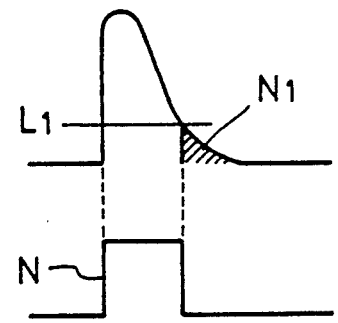
FIG. 9
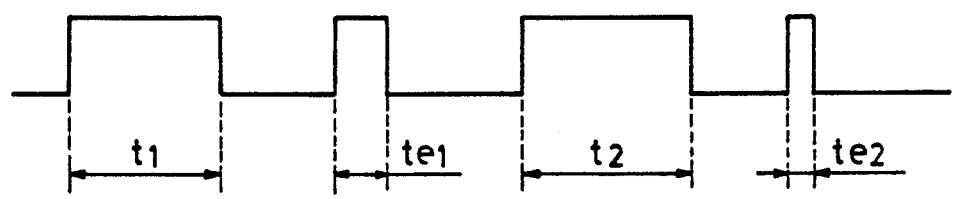

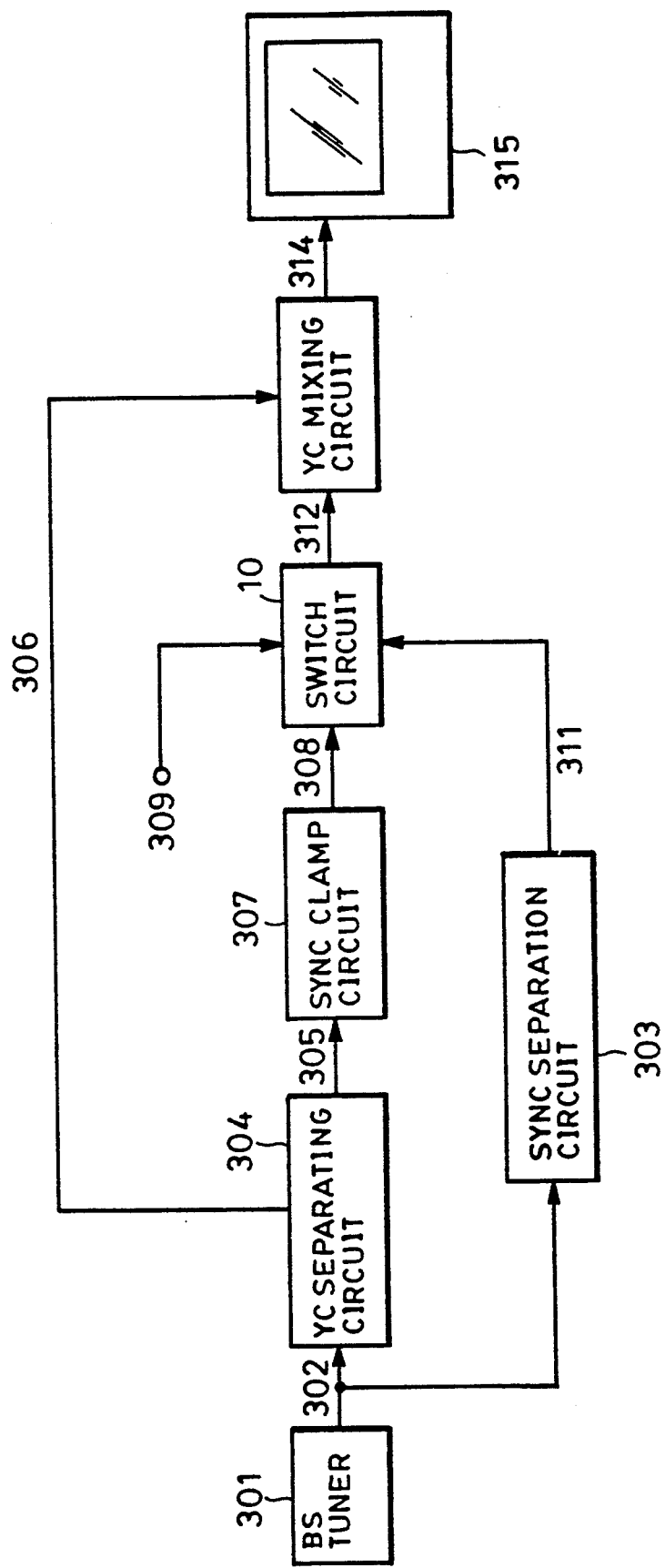

MOTION ADAPTIVE IMPULSE NOISE REDUCTION CIRCUIT

FIELD OF THE INVENTION

This invention relates to a noise eliminating circuit for eliminating impulse noises produced in an image signal after a tuner used in a television receiver such as a satellite broadcast receiver, etc.

BACKGROUND OF THE INVENTION

Since electromagnetic wave used for a satellite broadcast is in a microwave frequency band, when the level of reception is lowered by rainfall, snow on an antenna, etc., C/N (carrier/noise) of a received signal is also lowered. As C/N is lowered, S/N (signal/noise) of an image signal after FM demodulation is lowered. When C/N is further lowered and it falls below a threshold value, a particular kind of impulse noises are produced.

FIG. 2 (b) shows waveform of this kind of impulse noises produced in an image signal. When C/N is lowered, impulse noises B are produced, as indicated in FIG. 2 (b), on an image signal A, whose brightness varies stepwise, as indicated in FIG. 2 (a). When these impulse noises are produced, the brightness is raised or lowered significantly over several hundreds of nanoseconds. When they are observed on a monitor screen, they look like white or black killifish, which impairs remarkably the image quality. In order to eliminate such impulse noises, there is known a noise eliminating circuit as indicated in FIG. 7 disclosed e.g. in Technical Report of Juridical Foundation Television Society, Vol. 14, No. 42, pp. 16–18, August 1990. In FIG. 7, reference numeral 51 is a digital noise filter; 52 is a differential circuit; 53 is a comparing circuit; and 54 is an error detection preventing circuit. At first, a demodulated signal is A-D converted and color subcarrier and digital aural subcarrier are removed by means of the digital notch filter 51. Then the high frequency component of the image signal is taken out by means of the differential circuit 52. The signal is compared with a threshold in the level comparing circuit 53 and pixels exceeding the threshold value are judged to be suspected to be impulse noises. Further, in order to prevent erroneous detection, only when the none of two adjacent pixels on the upper and lower sides of each of the pixels is suspected to be an impulse noise, it is judged finally to be an impulse noise.

Impulse noises are eliminated by detecting the impulse noises from a demodulated signal of the image signal by using this noise eliminating circuit and by replacing the detected pixels including the impulse noises by pixels including no impulse noises, which succeed or precede them by one field or one scanning line. Concretely speaking, when the pixels to be replaced are selected, they should be replaced by pixels located obliquely on the upper or lower side succeeding or preceding by one field or one scanning line, as indicated in FIGS. 3(a) and 3(b), so that the phase of the color subcarrier multiplexed in the frequency in the image signal is continuous after the replacement of the pixels.

Such a prior art impulse noise detecting circuit, which detected noises on the basis of horizontal and vertical correlation in one field, had a drawback that impulse noises were apt to be erroneously detected.

Further, in the prior art circuit, there was a problem that since the composite image signal is interpolated, as it is, it is necessary to adjust the phase of the color subcarrier and that for this reason the interpolation should be effected as indicated in FIG. 3, and thus the precision of the interpolation is low, because the interpolation is effected by using pixels obliquely adjacent.

As other prior art techniques JP-A-Sho 63-110888, 110889 and 110890 can be cited. However these techniques have a drawback that detection precision is low, because they deal with an NTSC signal itself and noise elimination is effected before the YC separation.

OBJECT OF THE INVENTION

The object of the present invention is to provide a noise eliminating circuit, which can carry out precisely and surely detection and elimination of impulse noises in the image signal, when C/N of the received signal is lowered and the impulse noises are produced, and compensate impaired image quality with a high precision.

SUMMARY OF THE INVENTION

In order to achieve the above object, a noise eliminating circuit for a television receiver according to the present invention is characterized in that it comprises demodulating means for demodulating a modulated received signal coming from a receiving antenna to obtain a detected signal and an image signal including brightness information; noise detection and judgment means for detecting a noise component contained in the detected signal and judging presence or absence of an impulse noise component composed of individual pulses having great variations in the brightness, contained in the image signal, based on an amount of the noise component; and noise detecting and eliminating means, which effects interpolation processing for the brightness of impulse noise portion to output an image signal, from which the impulse noise component is removed, when it is judged that there exists the impulse noise component, and outputs the image signal from the demodulating means, when it is judged that there exists no impulse noise component.

According to the present invention, it is judged whether there exists C/N, by which an impulse noise is produced, or not. Only in the case where it is judged that it is C/N, by which an impulse noise is produced, the brightness of the impulse noise portion in the image signal is subjected to the interpolation processing to output the image signal, from which the impulse noise portion is removed, and since the image signal from the demodulating means is outputted in the other case, when impulse noises are produced in the image signal, which impairs the image quality of the displayed image, worsened image quality can be compensated by detecting the impulse noises to eliminate them.

BRIEF DESCRIPTION OF THE DRAWINGS

FIG. 1 is a block diagram indicating an embodiment of the television receiver including the noise eliminating circuit according to the present invention;

FIG. 2(a) shows a signal waveform, in which brightness varies stepwise;

FIG. 2(b) shows a waveform, in which pulse noises are superposed on the signal indicated in FIG. 2(a);

FIGS. 8(a) and 8(b) are waveform diagrams indicating the relation the threshold value and an impulse noise detection signal;

FIG. 9 shows a waveform indicating the impulse noise detection signal;

FIG. 18 is a block diagram indicating an embodiment of the synchronizing clamp device effecting pedestal substitution processing according to the present invention;

DETAILED DESCRIPTION

Figure 3A:
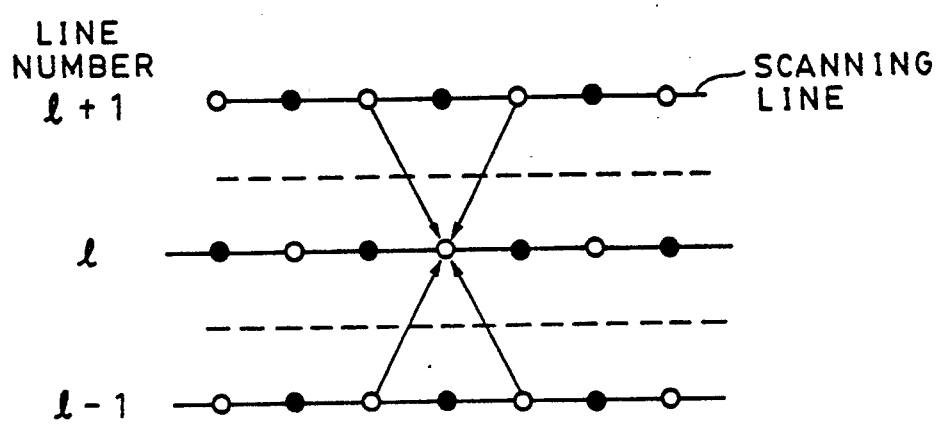
FIGS. 3(a) and 3(b) are diagrams for explaining a prior art method, by which impulse noises are detected and interpolated.
Figure 3B:
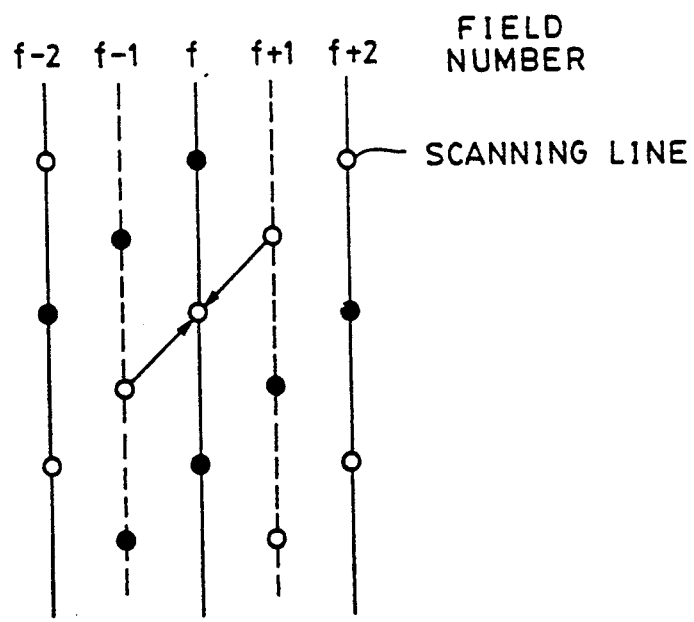

Hereinbelow several embodiments of the present invention will be explained in detail, referring to the drawings.

FIG. 1 is a block diagram indicating an embodiment of the television receiver including the noise eliminating circuit according to the present invention, in which reference numeral 1 is a receiving antenna; 2 is an intermediate frequency converting circuit (LNB); 3 is a first IF signal; 4 is a tuner; 5 is an image signal; 6 is a noise reduction circuit serving as impulse noise detecting and eliminating means; 7 is a detected signal; 8 is a noise detecting circuit serving as impulse noise detecting and judging means; 9 is a noise reduction control signal; 10 is a noise reduction image signal; 11 is an aural signal; and 12 is a monitor.

In such a construction, the signal received by the antenna 1 is frequency-converted into the first IF signal 3 by the LNB 2, which is sent to the tuner 4. The tuner 4 selects a desired channel and FM-demodulates it. The tuner 4 outputs the image signal 5, the detected signal 7 and the aural signal 11. The detected signal 7 is one immediately after the FM demodulation. After this detected signal 7 has been deemphasized, the 15 Hz triangular wave component is removed therefrom and further it is passed through an LPF in the image signal frequency band to obtain the image signal 5.

The noise reduction circuit 6 carries out the detection and the elimination of the impulse noises. The construction thereof in detail will be described later.

When the noise reduction circuit 6 detects impulse noises, it can erroneously detect them, recognizing parts, which are not impulse noises, as impulse noises (i.e. erroneous detection). If the noise eliminating operation were effected for the erroneously detected parts, the image quality at these parts would be impaired. For this reason the probability of generation of the erroneous detection should be satisfactorily smaller than the probability of generation of the impulse noises. Further, in the case where C/N producing no impulse noises (e.g. under about 6 dB) is being obtained, it is necessary to prohibit the noise elimination by the noise reduction circuit 6.

For this reason, there is disposed the noise detecting circuit for detecting C/N. This noise detecting circuit 8 detects only the noise component contained in the detected signal 7 to obtain a voltage responding to the noise level (e.g. about 1 to 2 V) Based on that voltage it is judged whether it is C/N producing impulse noises or not. A result of judgment is outputted as the noise reduction control signal 9 to the noise reduction circuit 6.

In the case where this control signal 9 indicates that it is C/N producing impulse noises, the noise reduction circuit 6 detects the impulse noise parts in the image signal. The brightness at these parts are subjected to an interpolation processing and supplied to the monitor 12 as the noise reduction image signal 10. On the contrary, in the case where the control signal 9 indicates that it is C/N producing no impulse noises, the image signal 5 from the tuner 4 is supplied to the monitor 12 as it is without any interpolation.

On the other hand, the aural signal from the tuner 4 is supplied to the monitor 12 as by the prior art technique.

Figure 4:
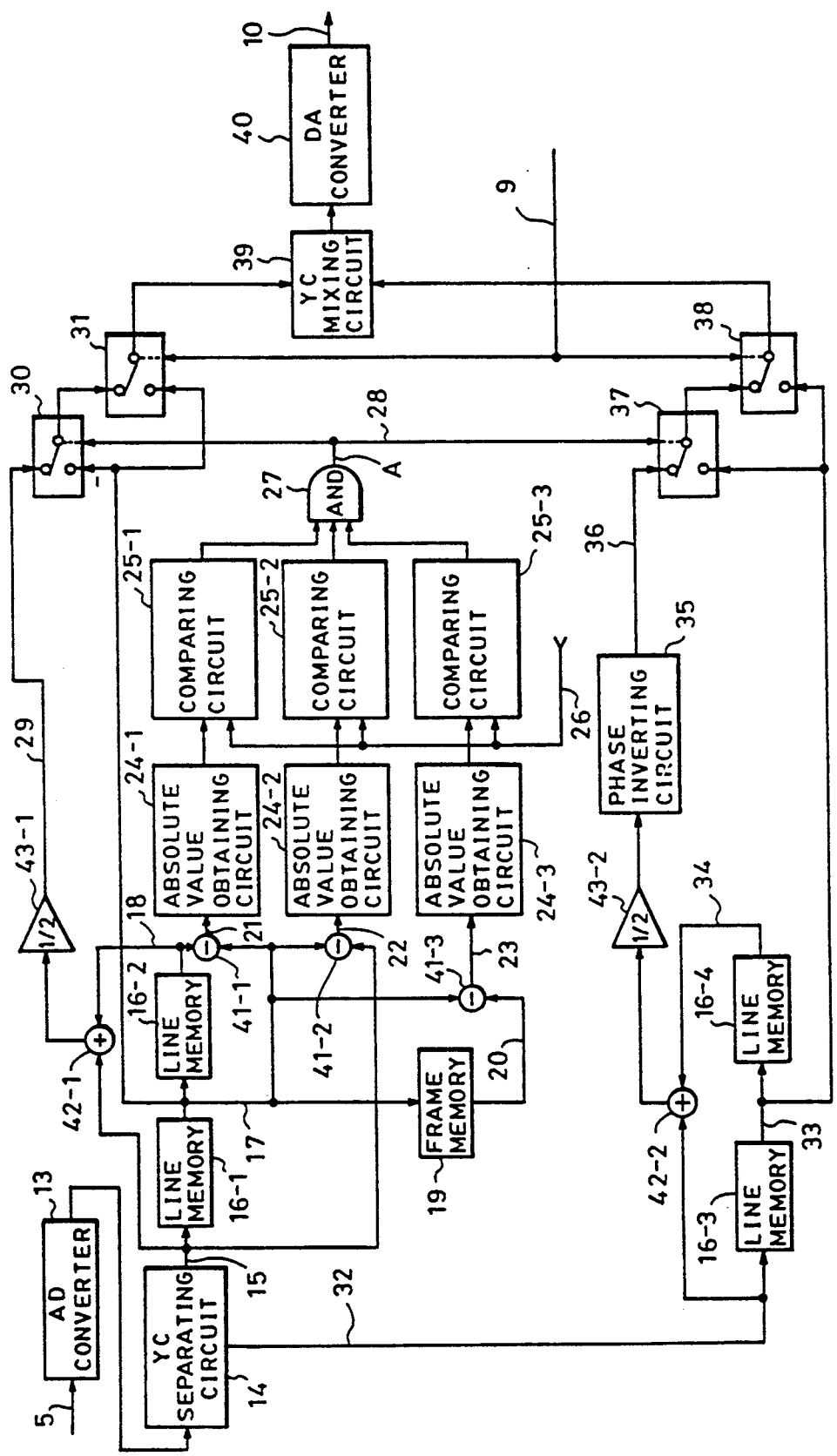
FIG. 4 is a block diagram indicating an embodiment of a noise reduction circuit in FIG. 1.

FIG. 4 is a block diagram indicating an example of the concrete construction of the noise reduction circuit 6, in which reference numeral 13 is an A/D converter; 14 is a Y/C separating circuit; 15 is a brightness signal; 16-1~16-4 are line memories; 17 is a 1H delayed brightness signal; 18 is a 2H delayed brightness signal; 19 is a frame memory; 20 is a frame delayed brightness signal; 21~23 are difference signals; 24-1~24-3 are absolute value obtaining circuits; 25-1~25-3 are comparing circuits; 26 is a threshold value; 27 is a three-input AND circuit; 28 is an impulse noise detection signal; 29 is an interpolated brightness signal; 30 and 31 are switches; 32 is a chrominance signal; 33 is a 1H delayed chrominance signal; 34 is a 2H delayed chrominance signal; 35 is a phase inverting circuit; 36 is an interpolated chrominance signal; 37 and 38 are switches; 39 is a YC mixing circuit; 40 is a DA converter; 41-1~41-3 are subtracters; 42-1~42-2 are adders; and 43-1~43-2 are ½ multipliers.

In FIG. 4, after the image signals 5 from the tuner 4 has been passed through the A/D converter 13, it is separated into the brightness signal 15 and the chrominance signal 32 by the YC separating circuit 14, which are supplied to the line memories 16-1~16-4.

The 1H and 2H delayed brightness signals 17 and 18 are obtained from the line memories 16-1 and 16-2, respectively. On the other hand, the 1H and 2H chrominance signals 33 and 34 and obtained from the line memories 16-3 and 16-4, respectively. The frame delayed brightness signal 20 is obtained by passing the 1H delayed brightness signal 17 through the frame memory 19.

Figure 5:
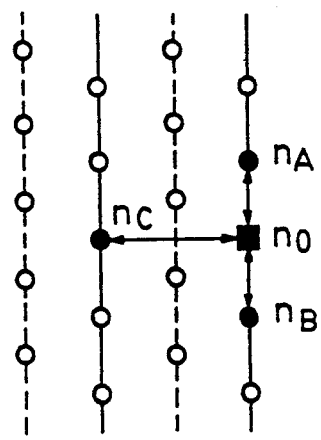
FIG. 5 is a diagram for explaining the principle for detecting impulse noises according to the present invention.

FIG. 5 represents various signals on a vertical space-time coordinate system around the 1H delayed brightness signal 17.

Supposing that n(0) in FIG. 5 represents the 1H delayed brightness signal 17 at a certain point of time t, n(A) and n(B) represent the 2H delayed brightness signal 18 and the brightness signal 15, respectively, and n(c) indicates the frame delayed brightness signal 20. Here (0) in n(0), etc. indicate suffixes for n.

Since a television image signal has a very high correlation between different lines and between different frames close to each other from the statistical point of view, if n(0) has no correlation greater than a certain value with either one of n(A), n(B) and n(C), it can be judged to be an impulse noise.

Figure 6:
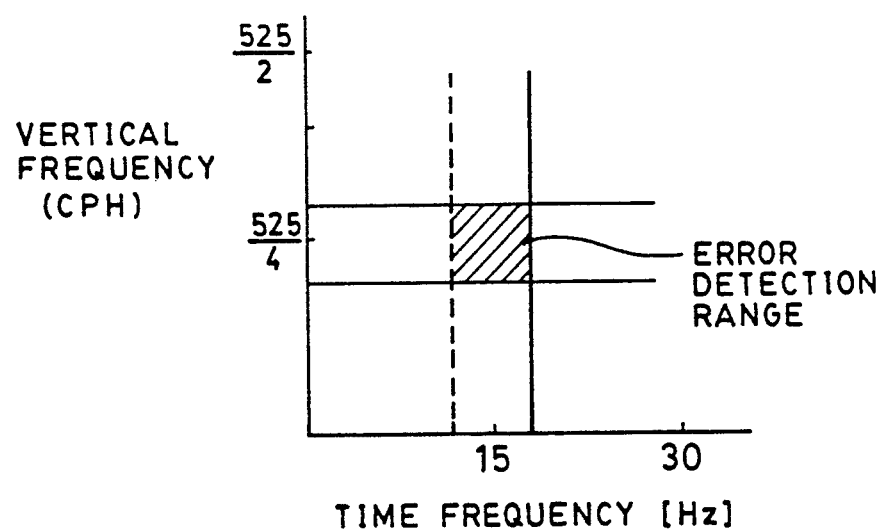
FIG. 6 is a diagram indicating a frequency range, where erroneous detection takes place by the method according to the present invention.
Figure 7:
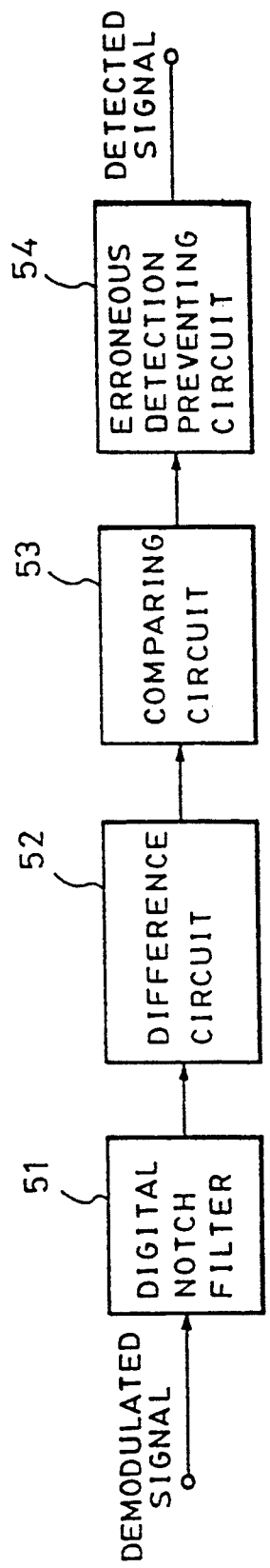
FIG. 7 is a block diagram showing a prior art impulse noise detecting circuit.

However, in the case of this embodiment, although erroneous detection can take place in a frequency range indicated by a hatched part in FIG. 6, it is verified experimentally that worsening in the image quality by this erroneous detection is sufficiently small with respect to the effect of the elimination of impulse noises.

The above described impulse noise detection operation will be explained, referring to FIG. 4.

The 2H delayed brightness signal n(A)18, the brightness signal n(B)15 and the frame delayed brightness signal n(C)20 are subtracted from the 1H delayed brightness signal n(0)17 by the subtracter 41-1 to 41-3, respectively. These difference signals, i.e. a n(0)-n(A) signal 21, a n(0)-n(B) signal 22 and a n(0)-n(C) signal 23, are calculated and the absolute values thereof are obtained by passing these difference signals through the absolute value obtaining circuits 24-1 to 24-3, respectively. It is judged by means of the comparing circuits 25-1 to 25-3 whether they are greater or smaller than the threshold value 26, respectively. A signal obtained by inputting the results thus obtained to the three-input AND circuit 27 is the impulse noise detection signal 28. Here an optimum value is set experimentally for the threshold value 26.

When an impulse noise is detected, an operation of replacing the part thus detected by a certain signal, i.e. an interpolation, is necessary.

For this purpose, in the embodiment indicated in FIG. 4, the brightness signal 15 and the 2H delayed brightness signal 18 are passed through the adder 42-1 and the ½ multiplier 43-1 and the interpolation is effected by using the average of these signals, which is inputted to the switch 30 as the interpolated brightness signal 29.

The switch 30 selects one of the 1H delayed brightness signal 17 and the interpolated brightness signal 29, responding to the impulse noise detection signal 28, which is the output of the AND circuit 27, to output it. The switch 31 is controlled by the noise reduction signal 9 so as to select the 1H delayed brightness signal 17 for C/N producing no impulse noises and the output of the switch 30 for C/N producing impulse noises.

Also for the chrominance signal 32 it is necessary to effect the interpolation, when an impulse noise is detected.

Therefore the chrominance signal 32 and the 2H delayed chrominance signal 34 are passed through the adder 42-2 and the ½ multiplier 43-2 to obtain the average of these signals. The phase thereof is inverted by the phase inverting circuit 35 to obtain the interpolated chrominance signal 36. This signal 36 and the 1H delayed chrominance signal 33 are inputted to the switches 37 and 38, respectively. The switch 37 working in synchronism with the switch 30 selects one of them, responding to the impulse noise detection signal 28, to output it. The switch 38 works in synchronism with the switch 31 and the operation thereof is completely identical to that described above.

Here it is for the purpose of having the interpolated chrominance signal 36 and the 1H delayed chrominance signal 33 in-phase that the phase of the interpolated chrominance signal 36 is inverted by the phase inverting circuit 35, because the phase of the chrominance signal is inverted for every line in the NTSC system.

The outputs of the switches 31 and 38 are combined by the YC mixing circuit 39 and the output thereof is converted into an analogue signal by the D/A converter 40 to be outputted as the noise reduction image signal 10.

In the embodiment described above of the present invention, theoretically no erroneous detection takes place in a still image.

Further, since the brightness signal and the chrominance signal are interpolated separately after the YC separation, they can be interpolated by using the upper and lower adjacent pixels. That is, since the interpolation can be effected by using the closest pixels, the worsened image quality can be compensated with a high precision.

When the impulse noise detection signal, which is detected in the case where the line correlation and the frame correlation are used as means for detecting impulse noises, used in a satellite broadcast receiver, etc. as described above, is utilized, differences appear in the effect of impulse noise elimination, depending on the magnitude of the set threshold value.

FIGS. 8(a) and 8(b) show impulse noise detection signals N, when the magnitudes of the threshold value are different from each other. The threshold value used in FIG. 8(a) is greater than that used in FIG. 8(b).

The hatched parts in FIGS. 8(a) and 8(b) indicate parts, which are not eliminated, but remain after the impulse elimination. For the sake of convenience these parts are called residual impulse noises $N_1$.

This residual impulse noise $N_1$ decreases, when the threshold value $L_1$ decreases, as indicated in FIG. 8(b) and thus the effect of the impulse noise elimination increases. However, if such an elimination is effected, the probability of erroneous detection, recognizing a part, which is no impulse noise, as an impulse noise increases, which gives rise to tendency that erroneous detection distortion takes place in the image after the impulse noise elimination, which lowers the image quality. For this reason, also in the noise eliminating circuit described above, the threshold value $L_1$ cannot be any infinitely small value and there is nothing for it but to allow a residual impulse noise is some degree.

Figure 10:
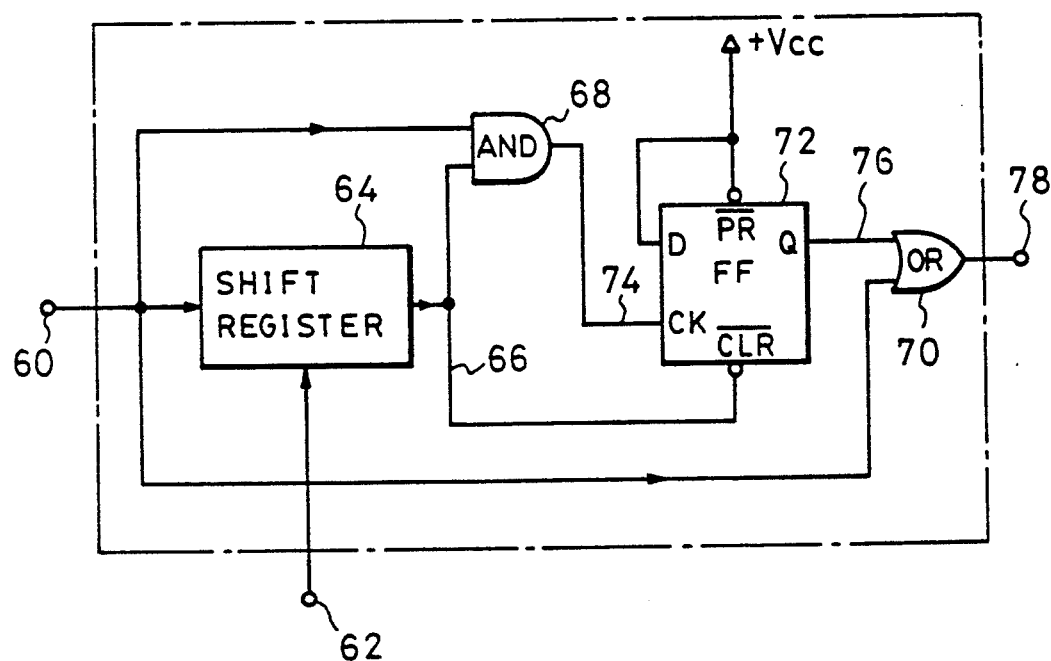
FIG. 10 is a block diagram indicating a residual impulse noise eliminating circuit according to the present invention.

For increasing further the effect of eliminating impulse noises by decreasing such a residual impulse noise after the impulse noise elimination, it is efficient to use the residual impulse noise eliminating circuit indicated in FIG. 10.

Almost all the tuners in satellite broadcast receives utilize the PLL detection system. Waveforms of impulse noises produced in the operation of this PLL detection system have an almost identical shape. If the waveform of the impulse noise is almost constant, when the threshold value for the impulse noise detection is set at a predetermined value, the impulse noise detection signal in this case has an almost constant width in time. Consequently, if this threshold value is suitably set, it is possible that, in almost all the cases, the width in time of an erroneous detection signal is smaller than the width in time of a true impulse noise detection signal.

FIG. 9 shows true impulse noise detection signals having widths in time t1 and t2 and erroneous detection signals having widths in time te1 and te2, when the threshold value is set suitably as described previously. In this case, denoting the average of the true impulse noise detection signals by t, the following relations are valid; $t = t1 = t2$, $te1 < t$ and $te2 < t$.

Using these relations, in the case where the width in time of the impulse noise detection signal is almost equal to t, the time of the impulse noise elimination is extended so that the residual impulse noise is decreased. In the case where the width in time is smaller than t, a signal for effecting a control, by which any special processing is not performed, is generated and the impulse noise detection signal described in the preceding embodiment is replaced thereby. In this way it is possible to decrease the residual impulse noise after the impulse noise elimination and thus to effect a more-efficient impulse noise elimination.

FIG. 10 indicates a residual impulse noise eliminating circuit, in which 60 is an impulse noise detection signal; 62 is a system clock; 64 is a shift register; 66 is an output of the shift register; 68 is an AND circuit; 70 is an OR circuit; 72 is a D-type flipflop; 74 is a clock input to this flipflop; 76 is a Q-output of this flipflop; and 78 is an impulse noise elimination signal.

The residual impulse noise eliminating circuit is inserted e.g. into the point A in FIG. 4.

Figure 11:
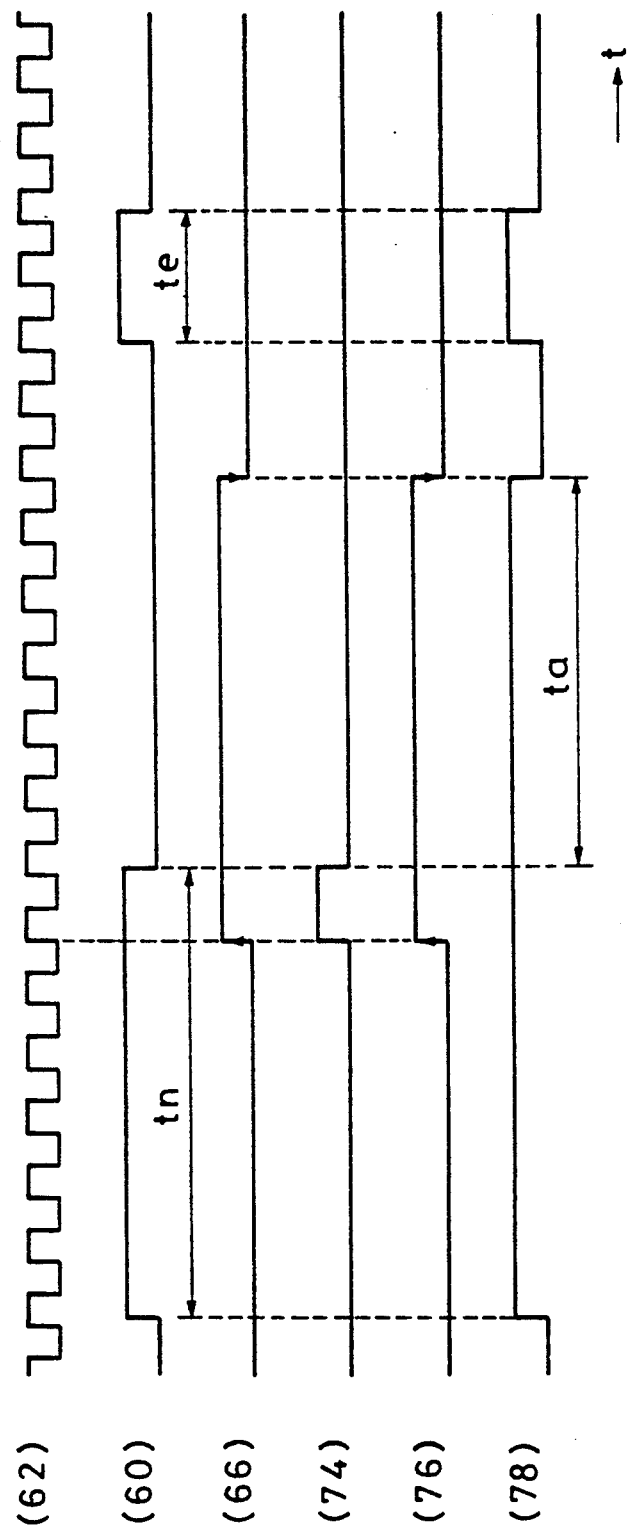
FIG. 11 is a timing chart for explaining the operation of the circuit indicated in FIG. 10.

The impulse noise detection signal 60 outputted by the noise reduction circuit 6 is applied to the shift register 64, the AND circuit 68 and the OR circuit 70. The output of the AND circuit 68 is the clock input 74 of the flipflop 72. Further the shift register output 66 is given to the AND circuit 68 and the clear terminal bar CLR of the flipflop 72. At the same time the Q-output 76 of the flipflop 72 is applied to the OR circuit 70. As the result, signal processing as indicated in the timing chart in FIG. 11 is effected in the various circuit described above. In the case where the detection time of the impulse noise detection signal 60 is longer than a certain value, e.g. 5 periods, counted in the system clock 62 (i.e. sampling clock), it is judged that there is a true impulse noise and in the case where it is shorter than 5 periods, it is judged that it is an erroneous detection.

TABLE 1 is a truth table for the flipflop 72.

TABLE 1

| CLR input (74) | AND output (68) | FF output (78) |
| --- | --- | --- |
| rise | H | H |
| H | H | H |
| fall | H | H |

That is, in the impulse noise detection signal 60 on the timing chart indicated in FIG. 11, the part having a detection time width of tn represents a true impulse noise and the part having a detection time width of te is an erroneous detection part. The time width of the impulse noise eliminating signal 78 is extended, only in the case where the detection time width of the impulse noise detection signal 60 is longer than 5 periods, counted in the system clock 62. The extended time ta at this time is longer than 5 periods and shorter than 6 periods, counted in the system clock 62.

Although, in the present embodiment, a shift register and a D-type flipflop are used, it is not limited thereto, but any circuit may be used, if an equivalent output can be obtained.

Further, although, in the present embodiment, explanation has been made, taking the television reception of the satellite broadcast as an example, application of the present invention is not limited thereto, but it can be applied to any receiving device in a wide field, if it has impulse-noise-like noises having residual impulse noises.

As explained above, using a residual impulse noise eliminating circuit described above, it is possible to reduce also residual impulse noises without increasing erroneous detection and thus the effect such as improvement in the image quality, etc. owing to the impulse noise elimination can be increased.

Next measures for preventing erroneous detection of impulse noises, in the case where the noise detecting method described above is applied to a moving image, will be explained.

Figure 12:
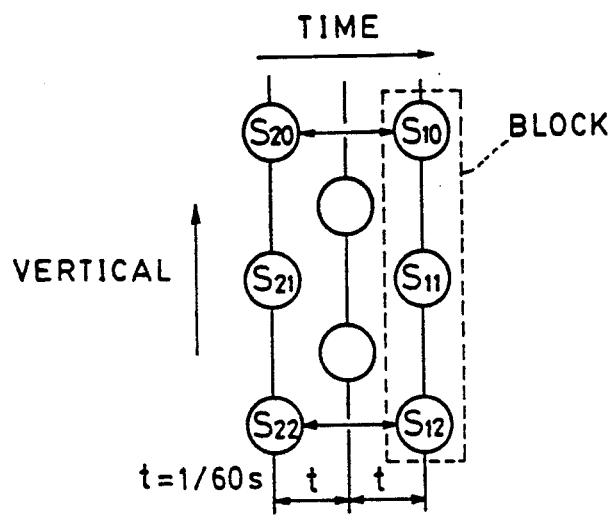
FIG. 12 is a diagram for explaining a motion detection method according to the present invention.

FIG. 12 shows a method for detecting motions of pixels necessary for the measures described above. It is thought that three pixels, i.e. a pixel $S_{11}$, which is an object, together with upper and lower adjacent pixels $S_{10}$ and $S_{12}$, form one block. It is judged that there is a motion in the pixel $S_{11}$, in the case where a motion is detected for at least one of $S_{10}$ and $S_{12}$. The detection of motion in the pixels $S_{10}$ and $S_{12}$ is effected by comparing them in the level with the pixels $S_{20}$ and $S_{22}$ preceding them by one frame and detecting which is greater, the level difference or a threshold value. That is, denoting the threshold value for the motion detection by $R_2$, it is judged that there is a motion in $S_{11}$, in the case where a condition $$|S_{10}-S_{20}| > R_2 \text{ or } |S_{12}-S_{22}| > R_2$$

is satisfied. The pixels, for which motions are excluded from expected impulse noises.

Figure 13:
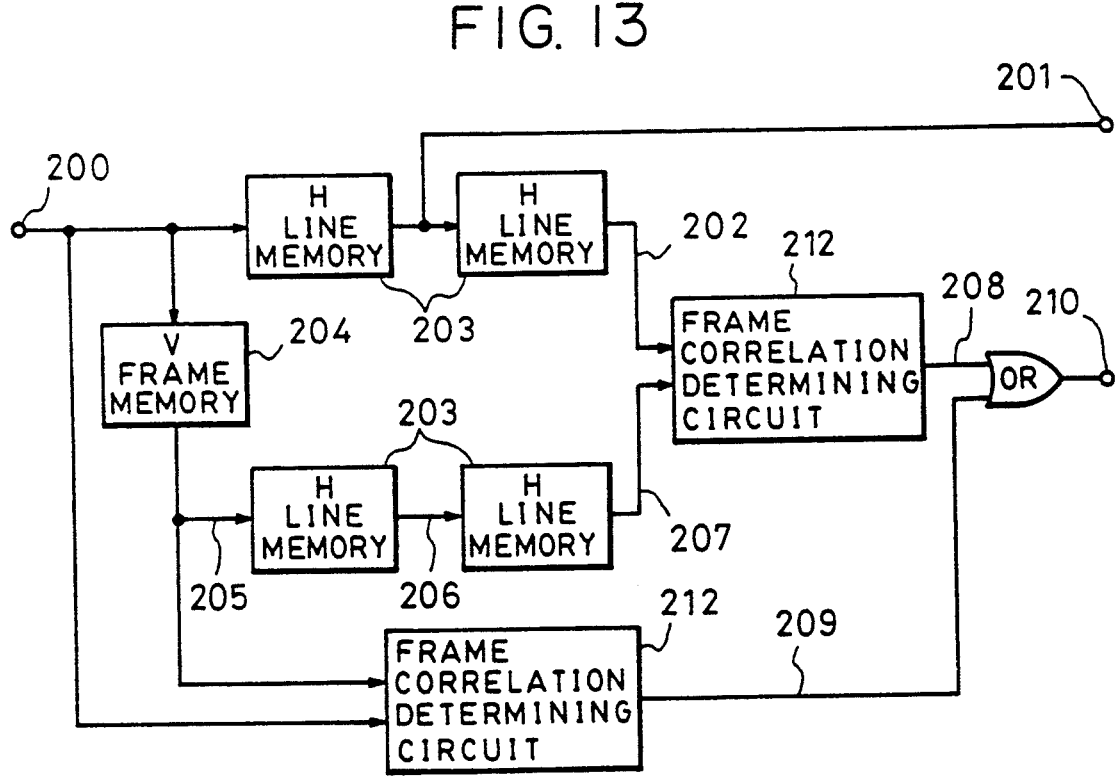
FIG. 13 is a block diagram showing the fundamental construction for realizing the motion detection method indicated in FIG. 12.

FIG. 13 shows the fundamental construction of a circuit for realizing the motion detecting method according to the present invention described above, in which reference numeral 200 is the pixel $S_{12}$ stated above; 201 is $S_{11}$; 202 is $S_{10}$; 203-1 to 203-4 are line memories; 204 is a frame memory; 205 is $S_{22}$; 206 is $S_{21}$, 207 is $S_{20}$; 208 is a 1H-preceding motion detection signal; 209 is a 1H-succeeding motion detection signal; 210 is a motion detection signal; 211 is an OR circuit; 212-1 and 212-2 are frame correlation determining circuits.

$S_{12}(200)$ is applied to the line memory 203-1 and the frame memory 204, $S_{11}(201)$ is obtained from the line memory 203-1, and $S_{10}$ is outputted through the line memory 203-2. $S_{22}$ is outputted by the frame memory 204, $S_{21}(206)$ is obtained by the line memory 203-3, and at the same time $S_{20}$ is outputted through the line memory 203-4.

Further the frame correlation determining circuit 212-2 judges $|S_{12}-S_{22}| > R_2$ and detects a motion for $S_{10}(202)$ preceding $S_{11}(201)$ by 1H to output a 1H-preceding motion detection signal 208.

On the other hand, the frame correlation determining circuit 212-2 judges $|S_{12}-S_{22}| > R_2$ and detects a motion for $S_{12}(200)$ succeeding $S_{11}(201)$ by 1H to output a 1H-succeeding motion detection signal 209.

The signals 208 and 209 stated above are inputted to the OR circuit 211 forming an OR thereof to obtain a motion detection signal 210.

Figure 14:
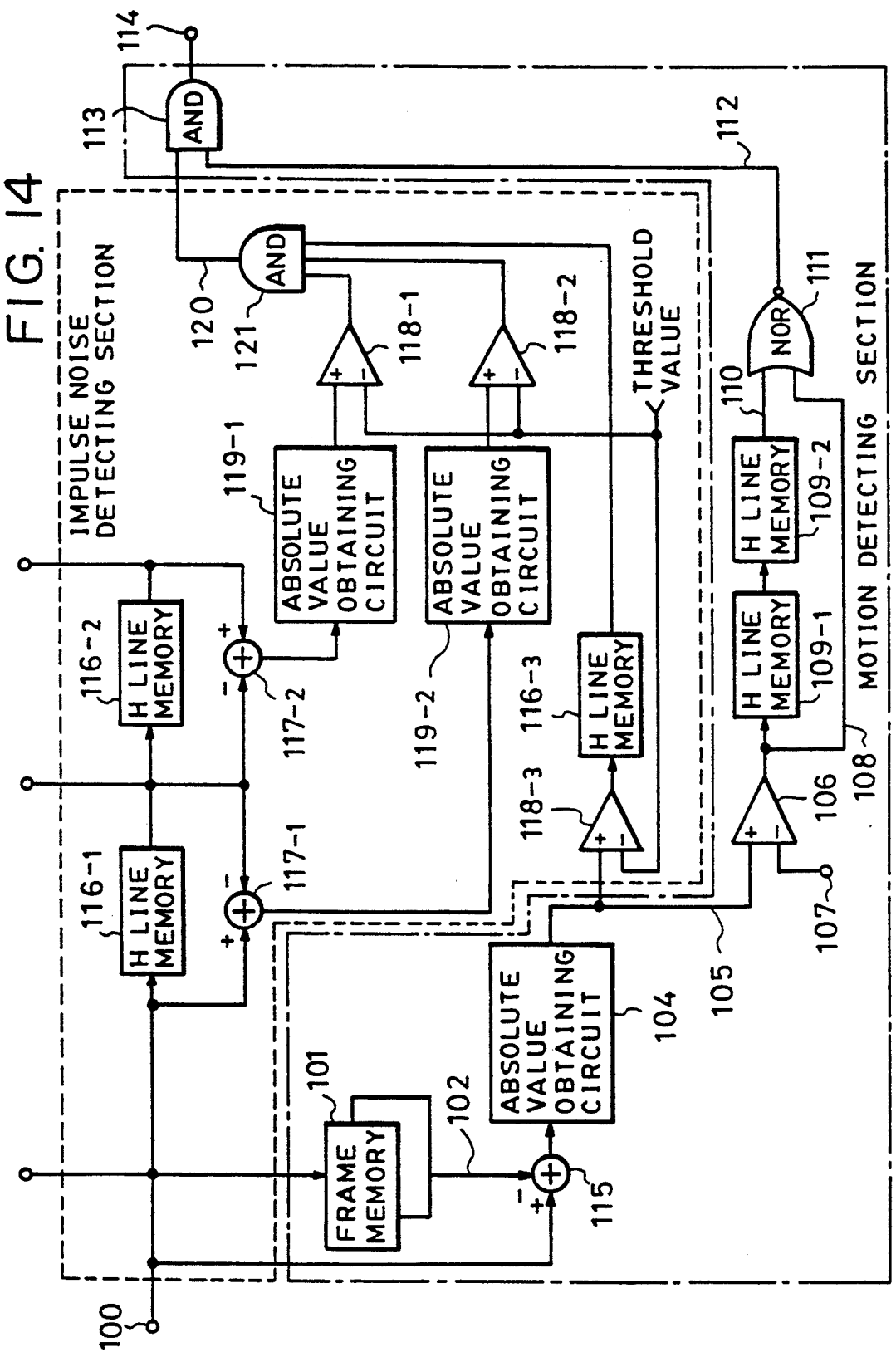
FIG. 14 is a block diagram indicating an embodiment of a noise reduction circuit having a motion detecting section according to the present invention.

FIG. 14 shows an embodiment of the present invention having a motion detecting section based on the principle described above, in which the part enclosed by a broken line is the impulse noise detecting section identical to that indicated in FIG. 1 and the part enclosed by a chaindotted line is the motion detecting section added according to the present invention.

Figure 15:
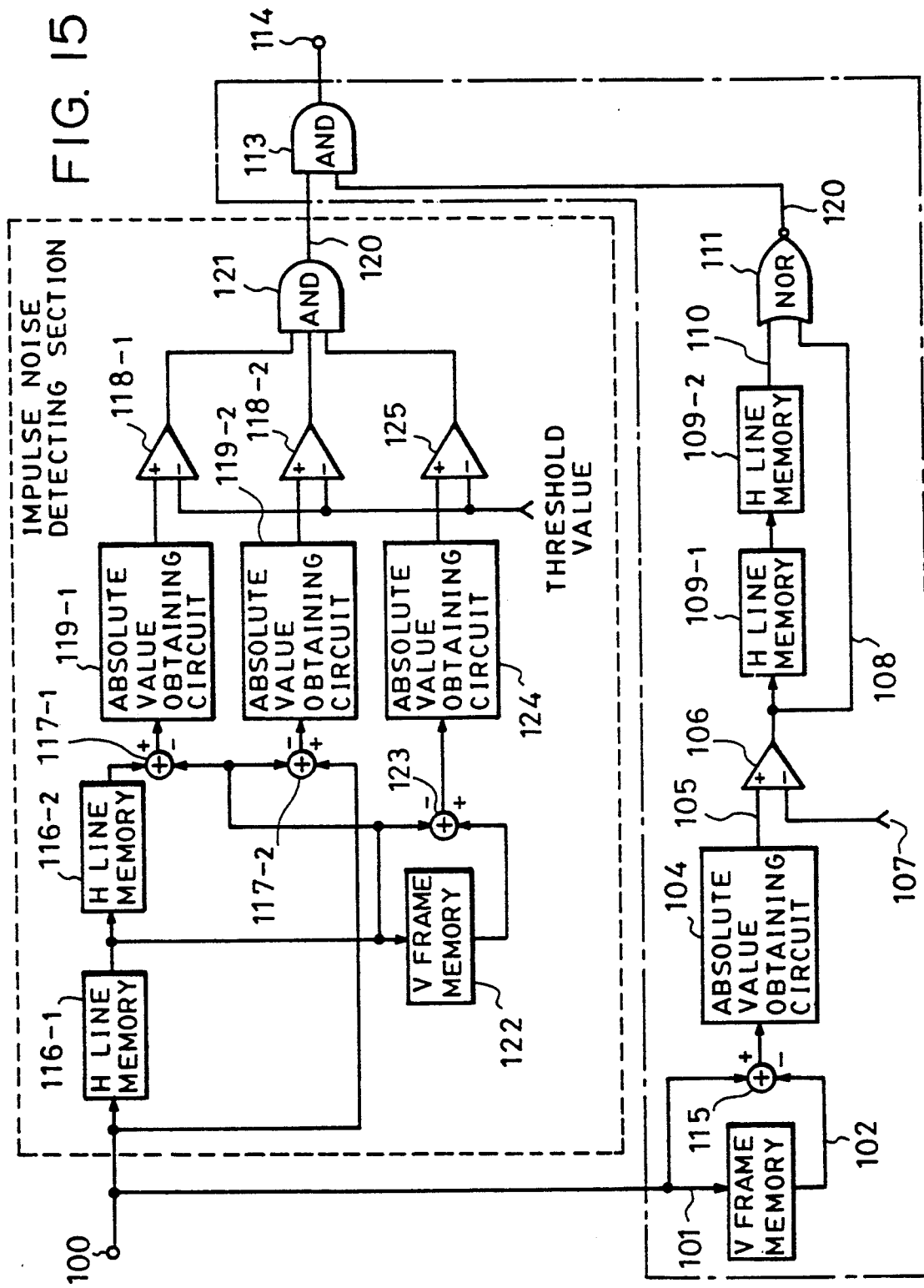
FIG. 15 is a block diagram indicating an example of a variation of the circuit indicated in FIG. 14.

FIG. 15 shows another embodiment of the present invention and what is different from FIG. 14 is that a part of the construction of the impulse noise detecting section enclosed by the broken line is changed in order to dispense with the frame memory.

In FIG. 14, the motion detecting section described above consists of a frame memory 101, an adder 115, an absolute value obtaining circuit 104, a comparing circuit 106, line memories 109-1 and 109-2, a NOR circuit 111, and an AND circuit 113, in which 102 is a frame delayed brightness signal, 105 is a frame different signal, 107 is a motion detecting threshold value signal, 108 is a 1H-succeeding motion detection signal, 110 is a 1H-preceding motion detection signal, and 112 is a motion detection signal.

In the motion detecting section the frame memory 101, the adder 115 and the absolute value obtaining circuit 104 constitute the frame difference component extracting means described above. Further the comparing circuit 106, the line memories 109-1 and 109-2 and the NOR circuit 111 constitute the motion detecting means described above and the AND circuit 113 forms the impulse noise judging means.

The impulse noise detecting section described above consists of line memories 116-1, 116-2 and 116-3, adders 117-1 and 117-2, comparing circuits 118-1, 118-2 and 118-3, absolute value obtaining circuits 119-1 and 119-2, and an AND circuit 121 and constitutes the noise detecting and judging means. Since the noise detecting and eliminating means described previously is constructed similarly to the noise interpolating sections (Y) and (C) indicated in FIG. 4, it is omitted in the figure.

In the embodiment indicated in FIG. 15, reference numerals identical to those used in FIG. 14 represent same or analogous circuits. Although the construction of the motion detecting section remains same, the impulse noise detecting section comprises further a frame memory 122, an adder 123, an absolute value obtaining circuit 124 and a comparing circuit 125 and it is constructed almost identically to that indicated in FIG. 14. The impulse noise detecting section indicated in FIG. 14 uses the frame memories, etc. in common with the motion detecting section and has a substantially same function as that indicated in FIG. 15.

Next the operation of the motion detecting section in the embodiment indicated in FIG. 14 will be explained.

The brightness signal (Y) 100 from the Y/C separating circuit 14 is inputted to the frame memory 101 and the adder 115. The difference between the brightness signal and the frame delayed brightness signal 102 delayed by one frame period by this frame memory is calculated and the frame difference signal 105 is taken out through the absolute value obtaining circuit 104.

This frame difference signal 105 is compared with the motion detecting threshold signal 107 in the level by the comparing circuit 106 and the 1H-succeeding motion detection signal 108 is obtained, depending on which is greater. At the same time the 1H-preceding motion detection signal 110 is obtained through the line memories 109-1 and 109-2. The two signals are inputted to the NOR circuit 111, which outputs the motion detection signal 112.

This motion detection signal 112 is at the L level, when a motion is detected, and at the H level, when no motion is detected. Further, since the suspected impulse noise signal (impulse noise detection signal described previously) is at the H level, when the signal is suspected to be an impulse noise, the impulse noise detection signal 114 outputted by the AND circuit 113, to which the motion detection signal 112 and the impulse noise detection signal 120 are inputted, is excluded from suspected impulse noises, when a motion is detected, and it is regarded that there is no impulse noise component.

In this way the relevant pixel is excluded from the suspected impulse noises, depending on the detection of the motion and erroneous detections of impulse noises in a moving image can be reduced.

The motion detection in the embodiment indicated in FIG. 15 is identical to that described above.

As explained above, in the impulse noise eliminating device described above, motion detection in the pixels in the upper and lower adjacent scanning lines within the same field, to which a pixel detected as a suspected impulse noise belongs, is effected and in the case where the motion is detected, the pixel is excluded from the suspected impulse noises. In this way it is possible to decrease image distortion due to erroneous detection of impulse noise in a certain particular frequency range in a moving image to such a level that it produces no disturbance in the visual sensation and thus to improve the image quality.

Figure 16:
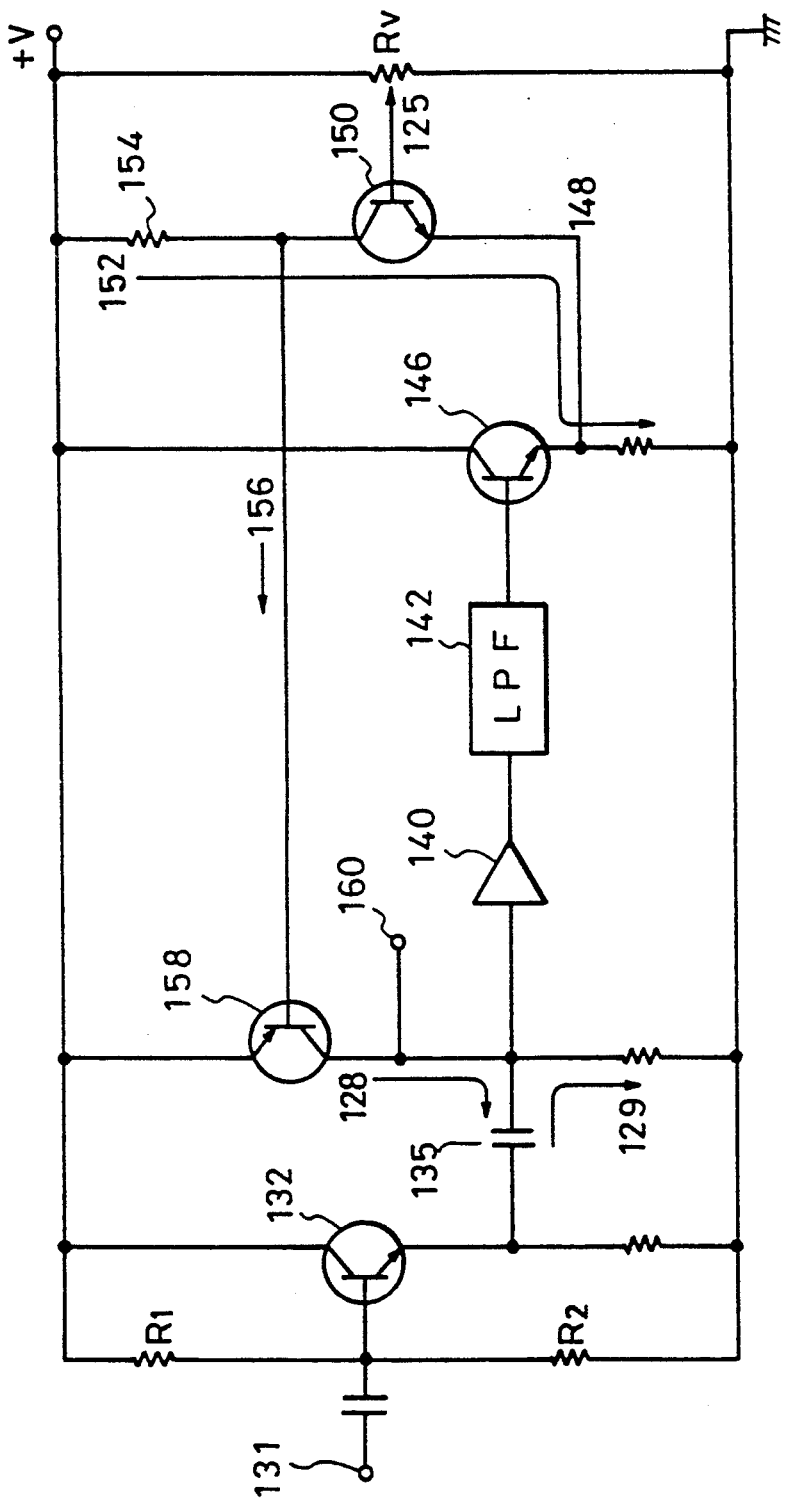
FIG. 16 is a circuit diagram indicating an embodiment of a synchronizing clamp circuit according to the present invention.

FIG. 16 shows an embodiment of a synchronization clamp circuit according to the present invention, which can effect the synchronization clamp without being influenced by impulse noises, even if they are produced in the synchronizing signal in the image signal. In the figure, 131 is an input image signal; $R_1$ and $R_2$ are bias resistors; and 132 is a first NPN transistor, these elements constituting the image signal input means described previously. 135 is a charging capacitor and 138 is a discharging resistor, these elements constituting the charging—discharging means described previously. 140 is an amplifier; 142 is a low pass filter (LPF); and 144 is a low frequency component image signal, these elements constituting the low frequency image component extracting means described previously.

146 is a fourth NPN transistor; 148 is an output signal thereof; 150 is a fifth NPN transistor; 152 is a switching current; 154 is a load resistor; and 156 is a switching signal (control signal), these elements constituting the control signal generating means described above. 158 is a third PNP transistor, which constitutes the charging—discharging control means. 160 is an image output signal. Further RV represents a variable resistor for generating a clamp voltage 125 (clamp reference signal).

In the synchronizing circuit indicated in FIG. 16, the input image signal 131 is biased by the power supply voltage +V and the resistors $R_1$ and $R_2$. Thereafter it is changed into a low impedance by the first transistor 132 of emitter follower connection and then the clamp operation is effected by charging—discharging of the charging capacitor 135.

The charging in this clamp operation is effected by the fact that the charging current 128 pours in the charging capacitor 135, in the case where the potential of the switching signal 156 inputted to the base of the third transistor 158 is lower than the emitter voltage (i.e. power supply voltage +V) of the third transistor 158. Further the discharging is effected by obtaining the discharging current 129 with the discharging time constant $T=RC$ described previously owing to the fact that the input resistance r of the amplifier 140 is negligibly small with respect to the resistance R of the discharging resistor 138.

Next the operation until the switching signal 156 for making the charging current 128 flow is generated will be explained.

Figure 17A:
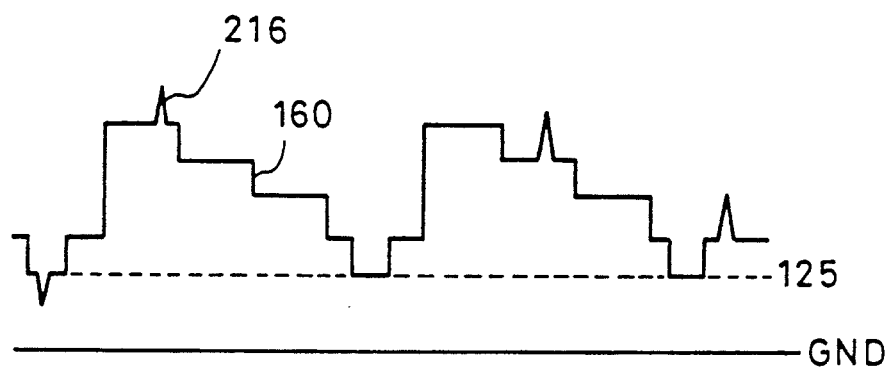
FIGS. 17(a) an 17(b) show waveforms for explaining the operation of the embodiment indicated in FIG. 16.
Figure 17B:
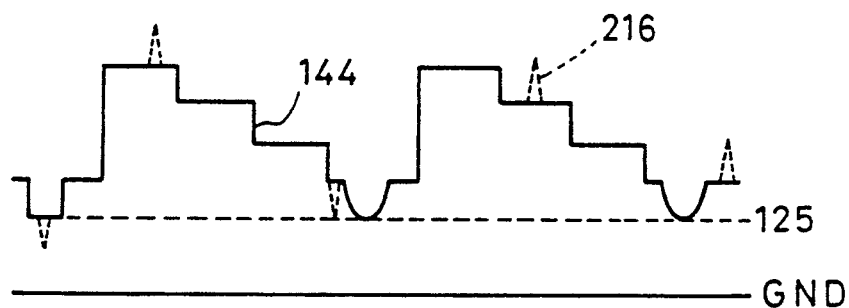

The image output signal 160 is outputted as a synchronization-clamped image signal, as indicated in FIGS. 17(a) and 17(b), and inputted at the same time to the low pass filter 142 through the amplifier 140. The low frequency component image signal 144, in which impulse noises are smoothened, is extracted as an output thereof. At this time the part corresponding to the level lowering of the signal stated above due to the low pass filter 142 is compensated by amplifying it previously by the amplifier 140 (or the clamp voltage may be regulated, taking this part corresponding to the level lowering into account). For the low pass filter 142 a filter having characteristics capable of smoothing satisfactorily impulse noises without impairing the synchronizing signal. For example, for the impulse noises produced when the FM modulation system is used for modulating the image signal as for the satellite broadcast, etc., in the case where the PLL demodulation system is used for the FM demodulation system in the present embodiment, it is more effective, if the cut-off frequency $f_c$ of the low pass filter 142 is set about 0.1 to 0.5 MHz.

FIGS. 17(a) and 17(b) show an example of the image output signal 160 and the low frequency component image signal 144.

The low frequency component image signal is transformed into a signal at a low impedance by the fourth transistor 146. When the output signal is applied to the emitter of the fifth transistor 150, if the potential (synchronizing signal level) of the output signal of the fourth transistor described above is lower than the clamp voltage 125, the switching current 152 flows and the switching signal 156 is generated across the load resistor 154. The third transistor 158 is driven by this switching signal 156 so that the negative peak of the synchronizing signal in the output signal of the fourth transistor 146 is at the potential of the clamp voltage 125. That is, regardless of presence or absence of the impulse noise 216 in the input image signal 131, it is possible to clamp the negative peak of the synchronizing signal in the image output signal 160 at the potential of the clamp voltage 125.

As described above an image signal synchronization-clamped without being influenced by impulse noise is obtained as the image output signal 160.

The synchronization clamp circuit described above is disposed either within a TV monitor section 12 of the satellite broadcast receiver as indicated e.g. in FIG. 1 or between the tuner section 4 and the impulse noise reduction circuit 6.

As explained above, by using the synchronization clamp circuit according to the present invention, the synchronization clamp can be effected without being influenced by impulse noises and thus normal signal processing is possible, even if the impulse noises are produced in the synchronizing signal of the image signal.

Next the construction of a synchronization clamp device capable of replacing a back porch part of the image signal by a signal containing no impulse noises will be explained in order that normal pedestal clamp can be effected, even if an impulse noise is produced in the image signal.

FIG. 18 shows an embodiment of the synchronization clamp device effecting the pedestal substituting processing according to the present invention, in which 301 is a BS tuner; 302 is a demodulated image signal; and 303 is a synchronizing signal separating circuit; these elements constituting the synchronizing component signal described previously. 304 is a YC separating circuit, which constitutes the brightness component extracting means described previously. 305 is a brightness signal; 306 is a chrominance signal; and 307 is a synchronization clamp circuit, which constitutes the synchronization clamp means described previously. 308 is a synchronization clamp brightness signal; 309 is a reference potential; and 310 is a switching circuit, which constitutes the pedestal substituting means. 311 is a back porch signal; 312 is a pedestal substituting brightness signal; 313 is a YC mixing circuit; 314 is a pedestal substitution image signal; and 315 is a television monitor.

The demodulated image signal 302 outputted by the BS tuner 301 is separated into the brightness signal 305 and the chrominance signal 306 by the synchronizing signal separating circuit 303 and the YC separating circuit 304 and thereafter the brightness signal 305 is inputted to the synchronization clamp circuit 307. The construction and the operation of the synchronization clamp circuit 307 are as indicated in FIGS. 16, 17(a) and 17(b).

As described previously, the synchronization clamp circuit 307 outputs the synchronization clamp brightness signal 308, for which the negative peak of the synchronizing signal is clamped at a constant potential without being influenced by impulse noises.

At this time, further, the potential difference between the negative peak of the synchronizing signal of the synchronization clamp brightness signal 308 and the pedestal level (potential of the back porch section) is kept always at an almost constant value. The reason is that firstly, since an image signal transmitted by a broadcast station comforms to RS 170A standard of US EIA, the level difference between the negative peak of the synchronizing signal and the pedestal level is kept at 40 IRE and secondly the level of the demodulated image signal 302 demodulated by the BS tuner is kept almost constant by AGC.

Since the negative peak of the synchronizing signal is clamped at a constant potential and the potential difference between the negative peak of the synchronizing signal and pedestal level is almost constant, the pedestal level of the synchronization clamp brightness signal 308 is kept at a constant potential regardless of presence or absence of the impulse noises.

Figure 19:
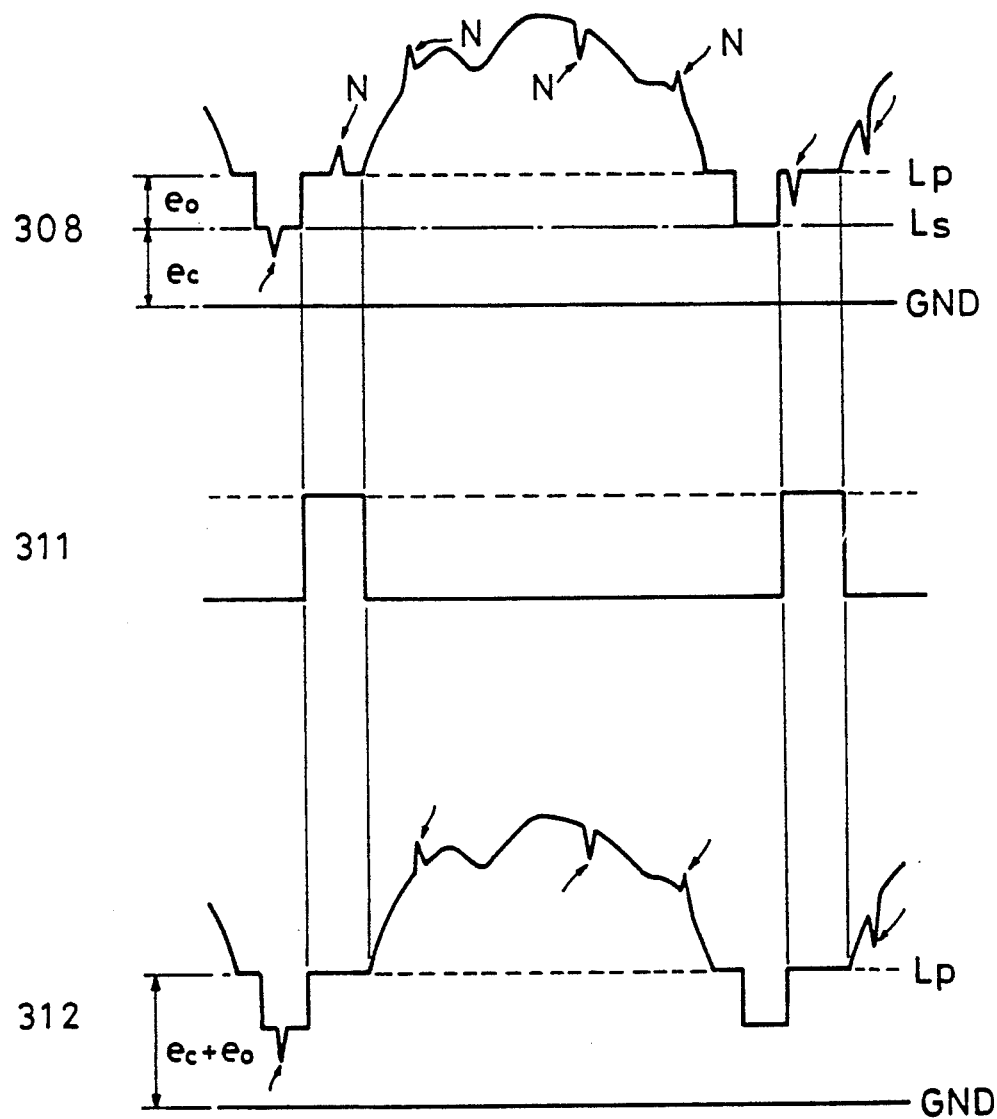
FIG. 19 is a diagram for explaining the operation of the device indicated in FIG. 18.

Now this is explained, referring to FIG. 19. For example, denoting the potential of the synchronization clamp level $L_s$ by $e_c$ and the potential difference between the negative peak of the synchronizing signal and the pedestal level $I_p$ by $e_0$, the pedestal level of the synchronization clamp brightness signal 308 is kept at a constant level of $e_c + e_0$. Here, as indicated in FIG. 18, if the reference potential 307 having a DC potential of $e_c + e_0$ is prepared and only the back porch section in the synchronization clamp brightness signal 308 is replaced by the reference potential 309 by means of the switching circuit 310, it is possible to obtain the pedestal substitution brightness signal 312, in which impulse noises N are eliminated from the back porch section described above. At this time the back porch signal 311 controlling the switching circuit 310 can be obtained easily from the synchronizing signal separating circuit 303.

The pedestal substitution brightness signal 312 and the chrominance signal 306 are combined by the YC mixing circuit 313 to obtain a pedestal substitution image signal 314. When this pedestal substitution image signal 314 is supplied to the television monitor 315, normal brightness information is displayed without being influenced by impulse noises.

As explained above, according to the embodiment described above, in the FM transmission of the image signal represented by the BS broadcast, even if impulse noises are produced in the demodulated image signal because of a low C/N, since normal pedestal clamp is effected without being influenced by impulse noises, the brightness information can be reproduced with a high fidelity on a display screen of the television monitor.

Although the object of all the embodiments described above of the present invention is the television receiver of NTSC system, it can be applied to the PAL system and the SECAM system by adding only slight modifications thereto.

Figure 20:
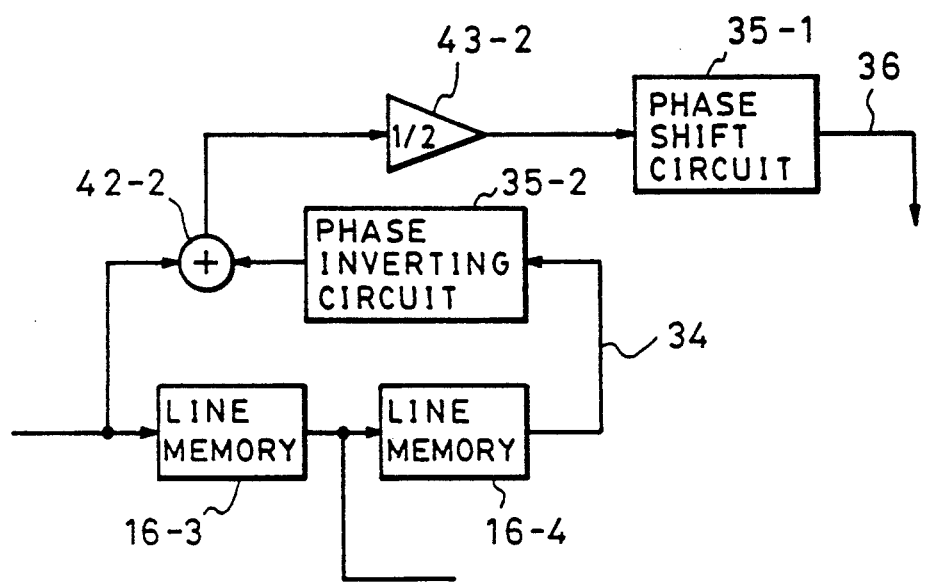
FIG. 20 is a block diagram indicating the principal part of the noise reduction circuit according to the present invention in the PAL system.

For example, since the phase of the chrominance signal is delayed by 90° for every scanning line in the PAL system, the phase of the 2H delayed chrominance signal 34 is advanced by 90° with respect to the phase of the 1H delayed chrominance signal 33 in FIG. 4, while the phase of the chrominance signal 32 is delayed by 90°. For this reason, a phase inverting circuit 35-2 (FIG. 20) is added to the device indicated in FIG. 4. The 2H delayed chrominance signal 34 is added after having been changed into a signal in-phase with respect to the chrominance signal 34. Further a 90° phase shift circuit 35-2 is used for changing a signal obtained by this addition into a signal in-phase with respect to the 1H delayed chrominance signal 33. It differs only at this point from the case of the NTSC system and all the other points such as the noise detection algorithm, processing of the brightness signal, etc. are identical to those used for the NTSC system.

Further the SECAM system differs from the NTSC system and the PAL system in that the color difference signal is FM-modulated.

Figure 21:
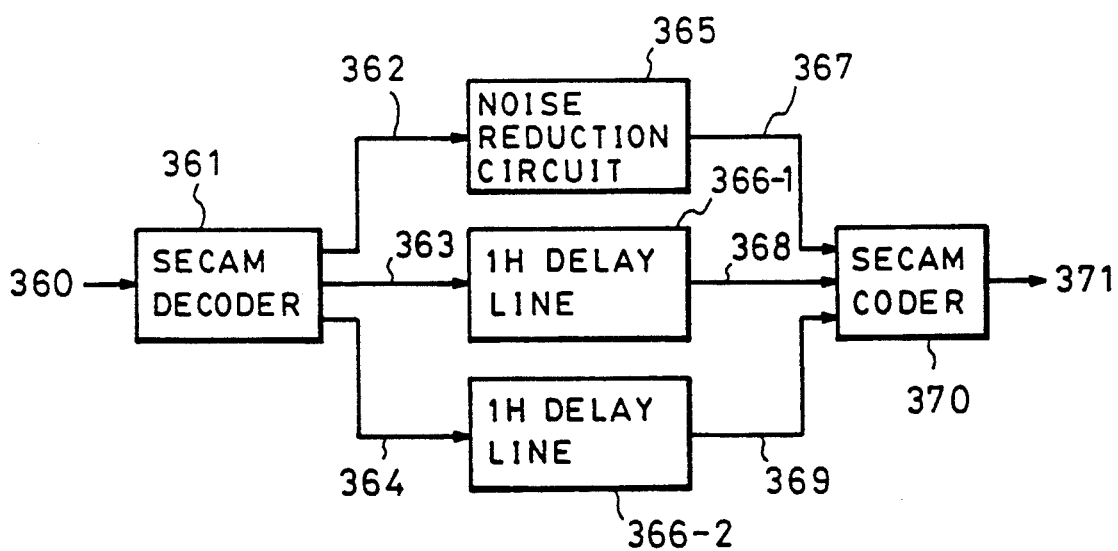
FIG. 21 is a block diagram indicating the noise eliminating device according to the present invention in the SECAM system.

FIG. 21 shows an embodiment of the impulse noise eliminating circuit according to the present invention in the SECAM system, in which 360 is an SECAM image signal; 361 is an SECAM decoder; 362 is a brightness signal (Y signal); 363 is an R-Y signal; 364 is a B-Y signal; 365 is a noise reduction circuit, 366-1 and 366-2 are 1H delay lines; 367 is a noise-reduction-processed brightness signal; 368 is a 1H delayed R-Y signal; 369 is a 1H delayed B-Y signal; 370 is an SECAM coder; and 371 is a noise-reduction-processed SECAM image signal.

The vertical resolving power of the color signal of the SECAM system is only a half of that of the NTSC system and the PAL system and further characteristics of the visual sensation of a human being is not so sensitive to color. For this reason, even if an impulse noise part is interpolated by using other signals containing no impulse noises for the R-Y signal 363 and the B-Y signal 364 at eliminating the impulse noises, effect thereof can be hardly expected for the SECAM system.

Figure 22:
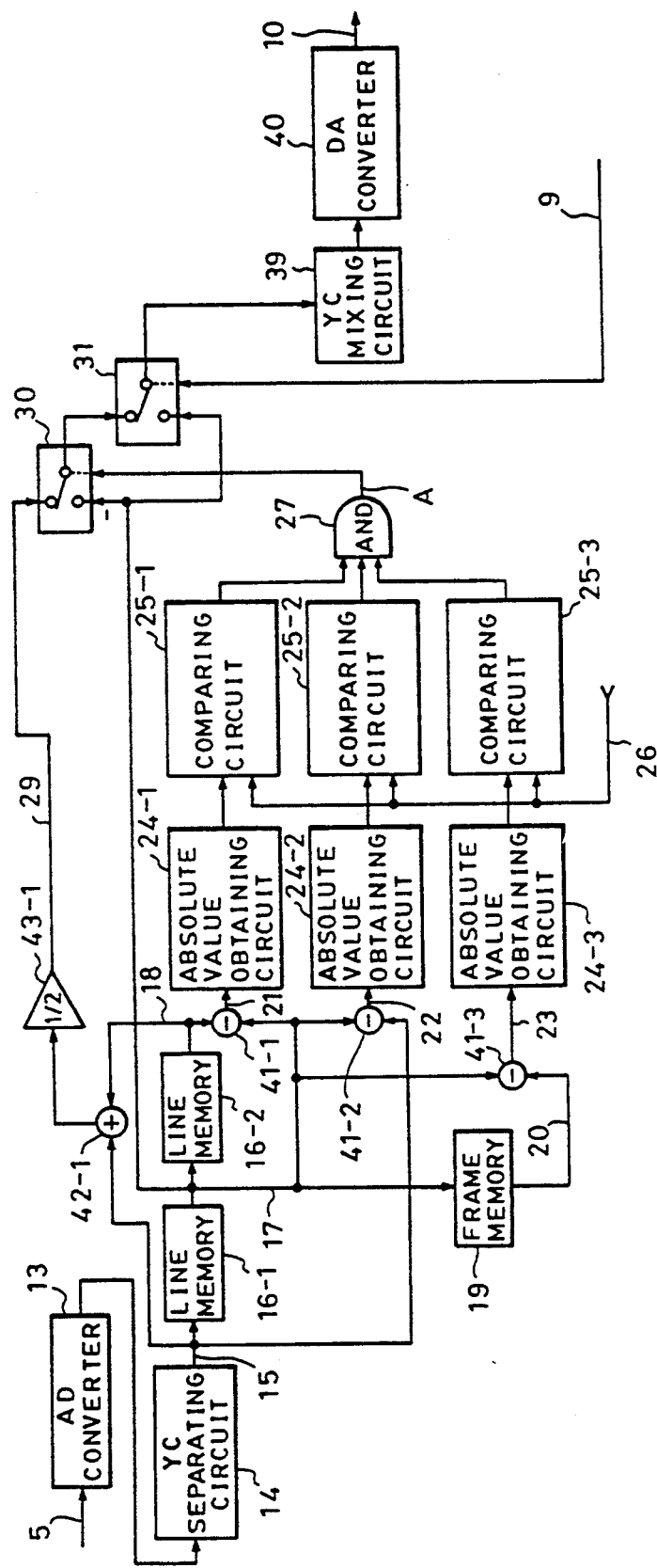
FIG. 22 is a block diagram indicating the noise reduction circuit according to the present invention in the SECAM system.

Therefore a noise reduction circuit for the SECAM system according to the present invention indicated in FIG. 22 is so constructed that impulse noises are eliminated for the brightness signal. In the figure, reference numerals identical to those used in FIG. 4 represent circuits identical or analogous thereto.

As explained above, according to the present invention, when C/N of the received signal is lowered, impulse noises are produced in the image signal, and the image quality of the displayed image is impaired, it is possible to restore significantly worsened image quality by detecting and eliminating the impulse noises.

What is claimed is:

1. A noise eliminating circuit for a television receiver having demodulating means for demodulating a modulated received signal coming from a receiving antenna to obtain a detected signal and an image signal including brightness information, comprising:

noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal;

YC separating means for separating said image signal into a brightness signal and a chrominance signal; and noise eliminating means which detects an impulse noise portion in said brightness signal to obtain an impulse noise detecting signal and effects interpolation processing for the brightness and the chrominance of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component.

2. A noise eliminating circuit according to claim 1, wherein said noise eliminating means includes:

first delaying means for delaying said brightness signal by a predetermined scanning time to output a delayed brightness signal;

impulse noise detecting means for detecting said impulse noise portion, based on said brightness signal and said delayed brightness signal, to obtain said impulse noise detection signal;

second delaying means for delaying said chrominance signal by a predetermined scanning time to output a delayed chrominance signal;

first interpolating means for outputting an interpolated brightness signal, starting from said brightness signal and said delayed brightness signal;

second interpolating means for outputting an interpolated chrominance signal, starting from said chrominance signal and said delayed chrominance signal;

first selecting means for selecting one of said delayed brightness signal and said interpolated brightness signal in response to said impulse noise detection signal;

second selecting means for selecting one of said delayed chrominance signal and said interpolated chrominance signal in response to said impulse noise detection signal; and YC mixing means for combining said brightness signal and said chrominance signal selected by said first and said second selecting means to output an interpolated image signal from which said impulse noise portion is removed.

3. A noise eliminating circuit according to claim 2, wherein said impulse noise detecting means comprises:

a calculating section for calculating a difference component signal between said brightness signal and said delayed brightness signal;

a comparing section for comparing said difference component signal with a predetermined reference signal; and a noise detecting section for obtaining said impulse noise detection signal in response to an output signal of said comparing section.

4. A noise eliminating circuit according to claim 2, wherein said first interpolating means includes a first interpolating circuit for forming an average of said brightness signal and said delayed brightness signal to obtain said interpolated brightness signal, and said second interpolating means includes a second interpolating circuit for forming an average of said chrominance signal and said delayed chrominance signal to obtain said interpolated chrominance signal.

5. A noise eliminating circuit for a television receiver having demodulating means for demodulating a modulated received signal coming from a receiving antenna to obtain a detected signal and an image signal including brightness information, comprising: a noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detecting signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component, wherein said noise eliminating means has a residual impulse noise eliminating circuit including:

means for comparing a level of said impulse noise detection signal with a predetermined reference level, detecting the impulse noise component composed of individual pulses having great variations in the brightness contained in said image signal, and outputting a noise detection signal having a predetermined detection time in response to a result of the comparison; and impulse noise eliminating means which judges that a residual impulse noise is included when the detection time of said noise detection signal is longer than a predetermined time, based on a predetermined period of a control signal, which extends said detection time based on said period so as to eliminate said residual impulse noise, and which outputs an impulse noise eliminating signal for which said detection time is extended.

6. A noise eliminating circuit according to claim 5, wherein said impulse noise eliminating means judges that a detection of residual impulse noise is erroneous when said detection time is shorter than said predetermined time, based on said period, to output an impulse noise eliminating signal having said detection time.

7. A noise eliminating circuit according to claim 2, comprising:

means for comparing a level of said impulse noise detection signal from said impulse noise detecting means with a predetermined reference level, detecting the impulse noise component composed of individual pulses having great variations in the brightness contained in said image signal, and outputting a noise detection signal having a predetermined detection time in response to a result of the comparison; and impulse noise eliminating means which judges that a residual impulse noise is included when the detection time of said noise detection signal is longer than a predetermined time based on a predetermined period of a control signal which extends said detection time based on said period so as to eliminate said residual impulse noise, and which outputs an impulse noise eliminating signal for which said detection time is extended;

wherein said impulse noise eliminating signal drives said first and second selecting means.

8. A noise eliminating circuit according to claim 5, wherein said residual impulse noise eliminating circuit comprises a shift register to which said impulse noise detection signal is inputted; and AND circuit to which an output of said shift register and said impulse noise detection signal are inputted; a flip flop circuit responding to the output of said shift register and an output of said AND circuit; and an OR circuit to which an output of said flipflop circuit and said impulse noise detection signal are inputted.

9. A noise eliminating circuit for a television receiver having demodulating means for demodulating a modulated received signal coming from a receiving antenna to obtain a detected signal and an image signal including brightness information, comprising: a noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detection signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component, wherein said image signal includes a brightness signal representative of said brightness information, and further including:

frame difference component extracting means for extracting a frame difference component signal from the image signal containing said brightness signal and a signal obtained by delaying said brightness signal by a predetermined number of frame periods;

motion detection means for comparing said frame difference component signal with a predetermined reference signal in level and detecting the presence or absence of motion in upper and lower adjacent pixels within a same field to output a motion detection signal; and impulse noise judging means which considers that there is no impulse noise component, even if said impulse noise component exists, except when motion detection is recognized by said motion signal, so that an output of said noise eliminating means is composed of only the image signal from said demodulating means.

10. A noise eliminating circuit according to claim 9, wherein said frame difference component extracting means includes a frame memory to which the brightness signal of said image signal is inputted; an adder for adding an output of said frame memory and said brightness signal; and an absolute value detecting circuit to which an output of said adder is inputted; and wherein said motion detecting means includes a comparing circuit to which an output of said absolute value detecting circuit is inputted; a first line memory to which an output of said comparing circuit is inputted; a second line memory to which an output of said first line memory is inputted; and a NOR circuit having inputs to which are applied an output of said second line memory and the output of said comparing circuit; said impulse noise judging means including an AND circuit responsive to an output of said NOR circuit.

11. A noise eliminating circuit for a television receiver having demodulating means for demodulating a modulated received signal coming from a receiving antenna to obtain a detected signal and an image signal including brightness information, comprising: a noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detection signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component, further including:

image signal inputting means through which a received image signal containing an impulse noise component in a synchronizing signal is inputted;

charging-discharging means for charging a capacitor with said image signal and discharging it with a certain time constant to obtain a synchronously clamped image output signal;

clamp reference signal generating means for generating a clamp reference signal for carrying out said synchronous clamp;

low frequency image component extracting means to which said charged image signal is inputted and which outputs a low frequency image component signal obtained by smoothing the impulse noise component contained in said image signal;

control signal generating means for generating a predetermined control signal depending on a difference between the level of the synchronizing signal of said low frequency image component signal and the level of said clamp reference signal;

charging control means for obtaining an image output signal by controlling the charging of said charging-discharging means, based on said control signal, so that the level of said synchronizing signal is substantially identical to the level of said clamp reference signal; and a synchronizing clamp device for obtaining an image output signal from which variations in the clamp level due to the impulse noise component are moved, by effecting a constant synchronizing clamp control so that the level of said synchronizing signal is substantially identical to the level of said clamp reference signal;

wherein said synchronizing clamp device is disposed on an output side of said noise eliminating means.

12. A noise eliminating circuit for a television receiver having demodulating means for demodulating a modulated received signal coming from a receiving antenna to obtain a detected signal and an image signal including brightness information, comprising: a noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detection signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component, further including:

impulse signal inputting means through which a received image signal containing an impulse noise component in a synchronizing signal is inputted;

charging-discharging means for charging a capacitor with said image signal and discharging it with a certain time constant to obtain a synchronously clamped image output signal;

clamp reference signal generating means for generating a clamp reference signal for carrying out said synchronous clamp;

low frequency image component extracting means to which said charged image signal is inputted and which outputs a low frequency image component signal obtained by smoothing the impulse noise component contained in said image signal;

control signal generating means for generating a predetermined control signal depending on a difference between the level of the synchronizing signal of said low frequency image component signal and the level of said clamp reference signal;

charging control means for obtaining an image output signal by controlling the charging of said charging-discharging means, based on said control signal, so that the level of said synchronizing signal is substantially identical to the level of said clamp reference signal; and a synchronizing clamp device for obtaining an image output signal from which variations in the clamp level due to the impulse noise component are removed, by effecting a constant synchronizing clamp control so that the level of said synchronizing signal is substantially identical to the level of said clamp reference signal;

wherein said synchronizing clamp device is disposed on an input side of said noise eliminating means.

13. A noise eliminating circuit according to claim 11, wherein said low frequency image component extracting means includes a low pass filter having characteristics capable of smoothing satisfactorily the impulse noise without impairing the synchronizing signal.

14. A noise eliminating circuit according to claim 12, wherein said low frequency image component extracting means includes a low pass filter having characteristics capable of smoothing satisfactorily the impulse noise without impairing the synchronizing signal.

15. A noise eliminating circuit for a television receiver having demodulating means for demodulating a modulated received signal coming from a receiving antenna to obtain a detected signal and an image signal including brightness information, comprising: a noise judgment means for detecting a noise component contained in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detection signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise treatment signal that there exists no impulse noise component, further including a synchronizing clamp device effected pedestal substitution processing, including:

brightness component extracting means for obtaining a brightness component signal from the image signal containing the impulse noise component;

synchronizing component signal extracting means for extracting a synchronizing component signal from said image signal;

synchronizing clamp means for effecting a clamp control at such a level that a potential difference between a negative peak of said brightness component signal and a pedestal level has a predetermined value to obtain a clamp-controlled brightness component signal having a constant pedestal level; and pedestal substitution means for replacing a porch portion of said clamp-controlled brightness component signal with the level of a reference signal by switching between said reference signal generated at approximately the same level as said pedestal level and said clamp-controlled brightness component signal, based on said synchronizing component signal, to eliminate an impulse noise component existing in said porch portion;

wherein said synchronizing clamp device is disposed on an output side of said noise eliminating means.

16. A noise eliminating circuit for a television receiver having demodulating means for demodulating a modulated received signal coming from a receiving antenna to obtain a detected signal and an image signal including brightness information, comprising: a noise judgment means for detecting a noise component containing in said detected signal and for judging the presence or absence of an impulse noise component composed of individual pulses which have great variations in brightness and are contained in said image signal, based on an amount of said noise component, and outputting a noise judgment signal; and noise eliminating means which detects an impulse noise portion in said image signal to obtain an impulse noise detection signal and effects interpolation processing for the brightness of the impulse noise portion, based on said impulse noise detection signal, to output an image signal from which the pulse noise component is removed when it is judged according to said noise judgment signal that there exists the impulse noise component, and to output the image signal from said demodulating means when it is judged according to said noise judgment signal that there exists no impulse noise component, further including a synchronizing clamp device effecting pedestal substitution processing, including:

brightness component extracting means for obtaining a brightness component signal from the image signal containing the impulse noise component;

synchronizing component signal extracting means for extracting a synchronizing component signal from said image signal;

synchronizing clamp means for effecting clamp control at such a level that a potential difference between a negative peak of said brightness component signal and a pedestal level has a predetermined value to obtain a clamp-controlled brightness component signal having a constant pedestal level; and pedestal substitution means for replacing a porch portion of said clamp-controlled brightness component signal with the level of a reference signal by switching between said reference signal generated at approximately the same level as said pedestal level and said clamp-controlled brightness component signal, based on said synchronizing component signal, to eliminate an impulse noise component existing in said porch portion;

wherein said synchronizing clamp device is disposed on an input side of said noise eliminating means.

17. A noise eliminating circuit according to claim 1, wherein said noise eliminating means has a residual impulse noise eliminating circuit including:

means for comparing a level of said impulse noise detection signal with a predetermined reference level, detecting the impulse noise component composed of individual pulses having great variations in the brightness contained in said image signal, and outputting a noise detection signal having a predetermined detection time in response to a result of the comparison; and impulse noise eliminating means, which judges that a residual impulse noise is included when the detection time of said noise detection signal is longer than a predetermined time based on a predetermined period of a control signal, which extends said detection time based on said period so as to eliminate said residual impulse noise, and which outputs an impulse noise eliminating signal for which said detection time is extended.

18. A noise eliminating circuit according to claim 17, wherein said impulse noise eliminating means judges that a detection of residual impulse noise is erroneous when said detection time is shorter than said predetermined time, based on said period, to output an impulse noise eliminating signal having said detection time.

19. A noise eliminating circuit according to claim 17, wherein said residual impulse noise eliminating circuit comprises a shift register to which said impulse noise detection signal is inputted; an AND circuit to which an output of said shift register and said impulse noise detection signal are inputted; a flipflop circuit responding to the output of said shift register and an output of said AND circuit; and an OR circuit to which an output of said flipflop circuit and said impulse noise detection signal are inputted.

20. A noise eliminating circuit according to claim 1, further including;
   frame difference component extracting means for extracting a frame difference component signal from the image signal containing said brightness signal and a signal obtained by delaying said brightness signal by a predetermined number of frame periods;
   motion detecting means for comparing said frame difference component signal with a predetermined reference signal in level and detecting the presence or absence of motion in upper and lower adjacent pixels within a same field to output a motion detection signal; and
   impulse noise judging means which considers that there is no impulse noise component, even if said impulse noise component exists, except when motion detection is recognized by said motion detection signal, so that an output of said noise eliminating means is composed of only the image signal from said demodulating means.

21. A noise eliminating circuit according to claim 20, wherein said frame difference component extracting means includes a frame memory to which the brightness signal of said image signal is inputted; an adder for adding an output of said frame memory and said brightness signal; and an absolute value detecting circuit to which an output of said adder is inputted; and wherein said motion detection means includes a comparing circuit to which an output of said absolute value detecting circuit is inputted; a first line memory to which an output of said comparing circuit is inputted; a second line memory to which an output of said first line memory is inputted; and a NOR circuit having inputs to which are applied an output of said second line memory and the output of said comparing circuit; and impulse noise judging means including an AND circuit responsive to an output of said NOR circuit.

22. A noise eliminating circuit according to claim 1, further including:

image signal inputting means through which a received image signal containing an impulse noise component in a synchronizing signal is inputted;

charging-discharging means for charging a capacitor with said image signal and discharging it with a certain time constant to obtain a synchronously clamped image output signal;

clamp reference signal generating means for generating a clamp reference signal for carrying out said synchronous clamp;

low frequency image component extracting means to which said charged image signal is inputted and which outputs a low frequency image component signal obtained by smoothing the impulse noise component contained in said image signal;

control signal generating means for generating a predetermined control signal depending on a difference between the level of the synchronizing signal of said low frequency image component signal and the level of said clamp reference signal;

charging control means for obtaining an image output signal by controlling the charging of said charging-discharging means, based on said control signal, so that the level of said synchronizing signal is substantially identical to the level of said clamp reference signal; and a synchronizing clamp device for obtaining an image output signal from which variations in the clamp level due to the impulse noise component are removed, by effecting a constant synchronizing clamp control so that the level of said synchronizing signal is substantially identical to the level of said clamp reference signal;

wherein said synchronizing clamp device is disposed on an output side of said noise eliminating means.

23. A noise eliminating circuit according to claim 1, further including:

image signal inputting means through which a received image signal containing an impulse noise component in a synchronizing signal is inputted;

charging-discharging means for charging a capacitor with said image signal and discharging it with a certain time constant to obtain a synchronously clamped image output signal;

clamp reference signal generating means for generating a clamp reference signal for carrying out said synchronous clamp;

low frequency image component extracting means to which said charged image signal is inputted and which outputs a low frequency image component signal obtained by smoothing the impulse noise component contained in said image signal;

control signal generating means for generating a predetermined control signal depending on a difference between the level of the synchronizing signal of said low frequency image component signal and the level of said clamp reference signal;

charging control means for obtaining an image output signal by controlling the charging of said charging-discharging means, based on said control signal, so that the level of said synchronizing signal is substantially identical to the level of said clamp reference signal; and a synchronizing clamp device for obtaining an image output signal from which variations in the clamp level due to the impulse noise component are removed, by effecting a constant synchronizing clamp control so that the level of said synchronizing signal is substantially identical to the level of said clamp reference signal;

wherein said synchronizing clamp device is disposed on an input side of said noise eliminating means.

24. A noise eliminating circuit according to claim 22, wherein said low frequency image component extracting means includes a low pass filter having characteristics capable of smoothing satisfactorily the impulse noise without impairing the synchronizing signal.

25. A noise eliminating circuit according to claim 23, wherein said low frequency image component extracting means include a low pass filter having characteristics capable of smoothing satisfactorily the impulse noise without impairing the synchronizing signal.

26. A noise eliminating circuit according to claim 1, further including a synchronizing clamp device effecting pedestal substitution processing, including:

brightness component extracting means for obtaining a brightness component signal from the image signal containing the impulse noise component;

synchronizing component signal extracting means for extracting a synchronizing component signal from said image signal;

synchronizing clamp means for effecting clamp control at such a level that a potential difference between a negative peak of said brightness component signal and a pedestal level has a predetermined value to obtain a clamp-controlled brightness component signal having a constant pedestal level; and pedestal substitution means for replacing a porch portion of said clamp-controlled brightness component signal with the level of a reference signal by switching between said reference signal generated at approximately the same level as said pedestal level and said clamp-controlled brightness component signal, based on said synchronizing component signal, to eliminate an impulse noise component existing in said porch portion;

wherein said synchronizing clamp device is disposed on an output side of said noise eliminating means.

27. A noise eliminating circuit according to claim 1, further including a synchronizing clamp device effecting pedestal substitution processing, including;

brightness component extracting means for obtaining a brightness component signal from the image signal containing the impulse noise component;

synchronizing component signal extracting means for extracting a synchronizing component signal from said image signal;

synchronizing clamp means for effecting claim control at such a level that a potential difference between a negative peak of said brightness component signal and a pedestal level has a predetermined value to obtain a clamp-controlled brightness component signal having a constant pedestal level; and pedestal substitution means for substituting a porch portion of said clamp-controlled brightness component signal with the level of a reference signal by switching between said reference signal generated at approximately the same level as said pedestal level and said clamp-controlled brightness component signal, based on said synchronizing component signal, to eliminate an impulse noise component existing in said porch portion;

wherein said synchronizing clamp device is disposed on an input side of said noise eliminating means.

* * * * *

UNITED STATES PATENT AND TRADEMARK OFFICE
CERTIFICATE OF CORRECTION

PATENT NO. : 5,268,760

DATED : December 7, 1993

INVENTOR(S) : Masaki SUYAMA

It is certified that error appears in the above-identified patent and that said Letters Patent is hereby corrected as shown below:

```
Column 14, line 41; change "detecting" to
          ---detection---.
Column 15, line 50; change "detecting" to
          ---detection---.
Column 16, line 31; after "signal" insert
          ---,---.
Column 17, line 20; after "motion" insert
          ---detection---.
Column 19, line 63; delete "a".
Column 20, line 18; change "taining" to ---tained---.
Column 21, line 64; change "and" to ---said---.
Column 23, line 12; change "include" to
          ---includes---.
Column 24, line 16; change "claim" to ---clamp---.
```

Signed and Sealed this

Seventeenth Day of May, 1994

*Attest:*

BRUCE LEHMAN

*Attesting Officer*    Commissioner of Patents and Trademarks